(12) United States Patent
Uehara et al.

(10) Patent No.: US 10,749,208 B2
(45) Date of Patent: Aug. 18, 2020

(54) SECONDARY BATTERY AND ELECTROLYTE LIQUID

(75) Inventors: Makiko Uehara, Tokyo (JP); Daisuke Kawasaki, Tokyo (JP); Takehiro Noguchi, Tokyo (JP); Akinobu Nakamura, Tokyo (JP); Kenichi Shimura, Tokyo (JP); Yoko Hashizume, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 1136 days.

(21) Appl. No.: 14/008,415

(22) PCT Filed: Mar. 16, 2012

(86) PCT No.: PCT/JP2012/056916
§ 371 (c)(1),
(2), (4) Date: Sep. 27, 2013

(87) PCT Pub. No.: WO2012/132976
PCT Pub. Date: Oct. 4, 2012

(65) Prior Publication Data
US 2014/0017572 A1   Jan. 16, 2014

(30) Foreign Application Priority Data
Mar. 28, 2011   (JP) .................. 2011-070109

(51) Int. Cl.
*H01M 10/056* (2010.01)
*H01M 10/052* (2010.01)
(Continued)

(52) U.S. Cl.
CPC ......... *H01M 10/056* (2013.01); *H01M 4/505* (2013.01); *H01M 4/525* (2013.01);
(Continued)

(58) Field of Classification Search
CPC ........................ H01M 10/056; H01M 10/0525
(Continued)

(56) References Cited

U.S. PATENT DOCUMENTS

| 2004/0202938 A1* | 10/2004 | Noguchi ............ C01G 45/1242 |
| | | 429/231.95 |
| 2007/0172734 A1* | 7/2007 | Noguchi ............... H01M 4/485 |
| | | 429/223 |

(Continued)

FOREIGN PATENT DOCUMENTS

| CN | 1477729 A | 2/2004 |
| CN | 1701459 A | 11/2005 |

(Continued)

OTHER PUBLICATIONS https://aiche.confex.com/aiche/2011/webprogram/Paper233864.html; Oct. 17, 2011; Qiang Dai et al.*

(Continued)

*Primary Examiner* — Amanda C. Walke
(74) *Attorney, Agent, or Firm* — Sughrue Mion, PLLC

(57) ABSTRACT

The object is to provide a lithium ion secondary battery which has an excellent cycle property even in high-temperature environment and which has small volume increase. An exemplary embodiment of the invention is a lithium ion secondary battery, comprising: a positive electrode, a negative electrode comprising a negative electrode active material, and an electrolyte liquid; wherein the electrolyte liquid comprises a chain-type fluorinated ester compound represented by a predetermined formula and a chain-type fluorinated ether compound represented by a predetermined formula; wherein the negative electrode active material comprises metal (a) that can be alloyed with lithium, metal oxide (b) that can absorb and desorb lithium ion, and carbon material (c) that can absorb and desorb lithium ion; and (Continued)

wherein metal (a) is silicon, and metal oxide (b) is silicon oxide.

14 Claims, 1 Drawing Sheet

(51) Int. Cl.
  *H01M 10/0569* (2010.01)
  *H01M 10/0567* (2010.01)
  *H01M 4/58* (2010.01)
  *H01M 4/505* (2010.01)
  *H01M 4/525* (2010.01)
  *H01M 10/0525* (2010.01)
  *H01M 4/62* (2006.01)

(52) U.S. Cl.
  CPC ....... *H01M 4/5825* (2013.01); *H01M 10/052* (2013.01); *H01M 10/0525* (2013.01); *H01M 10/0567* (2013.01); *H01M 10/0569* (2013.01); *H01M 4/622* (2013.01); *H01M 2300/0034* (2013.01); *H01M 2300/0037* (2013.01); *Y02T 10/7011* (2013.01)

(58) Field of Classification Search
  USPC .................................................. 429/326, 200
  See application file for complete search history.

(56) References Cited

U.S. PATENT DOCUMENTS

| | | | |
|---|---|---|---|
| 2009/0092892 A1* | 4/2009 | Yamaguchi et al. | 429/125 |
| 2010/0040954 A1* | 2/2010 | Amine | H01G 9/038 |
| | | | 429/322 |
| 2010/0279168 A1* | 11/2010 | Lee | H01M 10/0525 |
| | | | 429/163 |
| 2011/0212359 A1* | 9/2011 | Dai | H01M 10/0525 |
| | | | 429/149 |
| 2012/0321940 A1* | 12/2012 | Kawasaki et al. | 429/163 |

FOREIGN PATENT DOCUMENTS

| | | | |
|---|---|---|---|
| CN | 1833326 A | | 9/2006 |
| CN | 101584075 A | | 11/2009 |
| CN | 101874326 A | | 10/2010 |
| JP | 06-020719 A | | 1/1994 |
| JP | 06-325765 A | | 11/1994 |
| JP | 08298134 A | * | 11/1996 |
| JP | 11-026015 A | | 1/1999 |
| JP | 11025983 A | * | 1/1999 |
| JP | 11-086901 A | | 3/1999 |
| JP | 2000-021447 A | | 1/2000 |
| JP | 2003-100342 A | | 4/2003 |
| JP | 2003-123740 A | | 4/2003 |
| JP | 2003-168480 A | | 6/2003 |
| JP | 2004-047404 A | | 2/2004 |
| JP | 2006-012576 A | | 1/2006 |
| JP | 2008-192504 A | | 8/2008 |
| JP | 2008-257988 A | | 10/2008 |
| JP | 2008257988 A | * | 10/2008 |
| JP | 2009-123707 A | | 6/2009 |
| JP | 2009-152037 A | | 7/2009 |
| JP | 2010-086914 A | | 4/2010 |
| JP | 2010-086915 A | | 4/2010 |
| JP | 2010-123287 A | | 6/2010 |
| WO | WO 2011118387 A1 | * | 9/2011 |

OTHER PUBLICATIONS

Englsih translation of Ata M et al. (JP 08298134 A), Nov. 1996, Japan.*
English translation of Ko, JP 2008257988 A, Oct. 2008, Japan.*
English translation of Kariru, JP 11025983 A, Jan. 1999, Japan.*
International Search Report of PCT/JP2012/056916 dated Jun. 19, 2012.
Communication dated Mar. 31, 2015 from the State Intellectual Property Office of the People's Republic of China in counterpart application No. 201280015872.4.

* cited by examiner

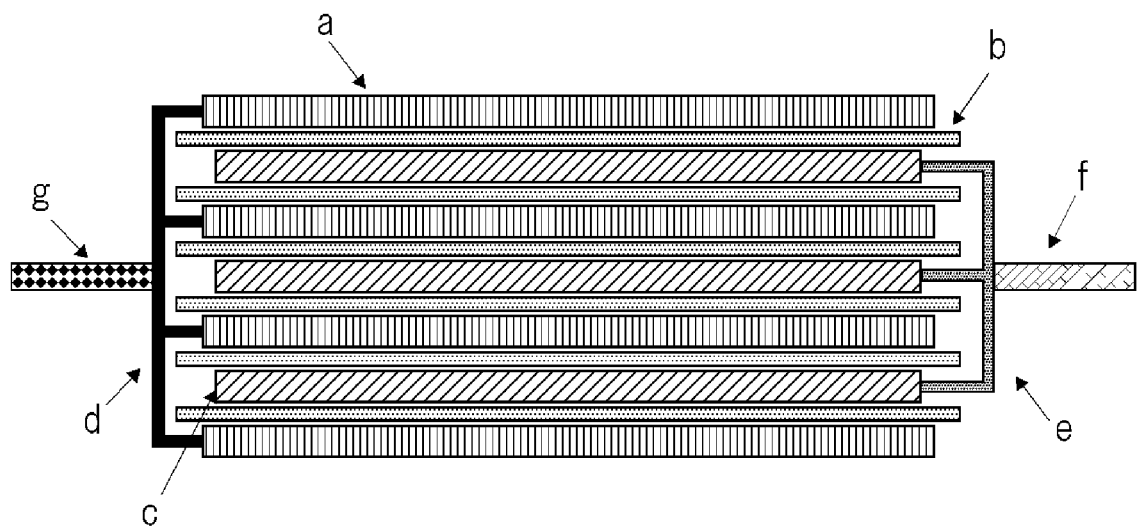

SECONDARY BATTERY AND ELECTROLYTE LIQUID

CROSS REFERENCE TO RELATED APPLICATIONS

This is a National Stage of International Application No. PCT/JP2012/056916 filed Mar. 16, 2012, claiming priorities based on Japanese Patent Application No. 2011-070109 filed Mar. 28, 2011 and International Application No. PCT/JP2011/072036 filed Sep. 27, 2011, the contents of all of which are incorporated herein by reference in their entirety.

TECHNICAL FIELD

An exemplary aspect of the present invention relates to a secondary battery, and particularly to a lithium ion secondary battery.

BACKGROUND ART

With the rapid expansion of the market for laptop computers, mobile phones, electric vehicles, and the like, a secondary battery having a high energy density is expected. Examples of a method for obtaining a secondary battery having a high energy density include a method in which a negative electrode material having a large capacity is used, and a method in which an electrolyte liquid having an excellent stability is used.

As for the negative electrode material, using silicon or silicon oxide as a negative electrode active material has been tried as disclosed in, for example, Patent Documents 1 to 3. Patent Document 1 discloses using silicon oxide or a silicate as a negative electrode active material of a secondary battery. Patent Document 2 discloses a negative electrode for a secondary battery which has an active material layer containing a carbon material particle that can absorb and desorb lithium ion, a metal particle that can be alloyed with lithium, and an oxide particle that can absorb and desorb lithium ion. Patent Document 3 discloses a negative electrode material for a secondary battery which is formed by coating the surface of a particle, which has a structure in which a silicon fine crystal is dispersed in a silicon compound, with carbon. The negative electrode active materials described in Patent Documents 2 and 3 have an effect of reducing volume change as the entire negative electrode.

As for the electrolyte liquid, using an electrolyte liquid containing another compound in addition to a conventional non-aqueous electrolyte liquid has been tried as disclosed in, for example, Patent Documents 4 to 6.

Patent Document 4 discloses using an electrolyte containing an asymmetric non-cyclic sulfone and a chain-type ester compound.

Patent Documents 5 and 6 disclose using a non-aqueous electrolyte liquid containing a fluorinated ether.

Patent Document 7 discloses, in the Examples, an electrolyte liquid containing any compound among fluorine-containing ethers, fluorine-containing esters, and fluorine-containing carbonates.

Patent Documents 8 and 9 disclose an electrolyte liquid containing a fluorine-containing ester compound.

Also, examples of the method for improving energy density of the battery include not only using an active material that has high capacity, but also increasing an operating potential of the battery and improving charge/discharge efficiency, cycle life, or the like. From among these methods, a method that increases an operating potential of the battery is effective for downsizing and weight-saving a battery module used for electronic vehicles or the like because an assembled battery having a smaller number of serially-connected batteries than a conventional assembled battery can be provided.

As a 4 V class positive electrode active material for a lithium ion secondary battery, lithium cobaltate and lithium manganite (average operating potential: 3.6 to 3.8 V, with respect to lithium potential) are known. In contrast, as a 5 V class positive electrode active material, for example, compounds (average operating potential: 4.6 V or more, with respect to lithium potential) obtained by substituting Mn of a spinel type lithium manganate by Ni, Co, Fe, Cu, Cr, or the like are known.

For example, the capacity of $LiNi_{0.5}Mn_{1.5}O_4$ that is a 5 V class active material is 130 mAh/g or more, and the average operating voltage is 4.6 V or higher with respect to metal Li, and the material is expected as a material having high energy density. Further, the spinel type lithium manganese oxide is advantageous in that it has a three-dimensional lithium spreading path, in that it has thermodynamic stability higher than the other compound, and also in that it can be easily synthesized.

For example, Patent Documents 10 or 11 disclose a secondary battery in which a fluorinated solvent is used in the case of using a positive electrode active material which has charging and discharging field of 4.5 V or higher.

CITATION LIST

Patent Document

Patent Document 1: JP 6-325765 A
Patent Document 2: JP 2003-123740 A
Patent Document 3: JP 2004-47404 A
Patent Document 4: JP 2000-21447 A
Patent Document 5: JP 11-26015 A
Patent Document 6: JP 2010-123287 A
Patent Document 7: JP 2008-192504 A
Patent Document 8: JP 11-86901 A
Patent Document 9: JP 6-20719 A
Patent Document 10: JP 2003-100342 A
Patent Document 11: JP 2003-168480 A

SUMMARY OF THE INVENTION

Problem to be Solved by the Invention

As mentioned above, studies regarding the negative electrode active material or the electrolyte liquid are carried out. However, in the field of the secondary battery, it is required to develop a secondary battery which can be repeatedly used even in high-temperature environment. That is, further improvements for the secondary battery such that the capacity maintenance rate by repeated charge and discharge can be kept high and such that volume increase can be reduced are required.

Also, a fluorinated solvent as mentioned above is thought to be effective in order to reduce the gas generation. However, the fluorinated solvent generally has a low dielectric constant, and it may become difficult to dissolve a lithium salt such as $LiPF_6$ when the content of the fluorinated solvent is increased.

Thus, an object of en exemplary aspect of the present invention is to provide a lithium ion secondary battery which has an excellent cycle property and which has small volume increase, even in high-temperature environment.

Means of Solving the Problem

One of an exemplary embodiment of the present invention is:

a lithium ion secondary battery, comprising: a positive electrode, a negative electrode comprising a negative electrode active material, and an electrolyte liquid;

wherein the electrolyte liquid comprises a chain-type fluorinated ester compound represented by following formula (1) and a chain-type fluorinated ether compound represented by following formula (2);

wherein the negative electrode active material comprises metal (a) that can be alloyed with lithium, metal oxide (b) that can absorb and desorb lithium ion, and carbon material (c) that can absorb and desorb lithium ion; and wherein metal (a) is silicon, and metal oxide (b) is silicon oxide;

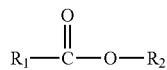

(1)

wherein, in formula (1), $R_1$ and $R_2$ each independently denote an alkyl group or a fluorine-substituted alkyl group, and at least one of $R_1$ and $R_2$ is a fluorine-substituted alkyl group; and

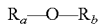

(2)

wherein, in formula (2), $R_a$ and $R_b$ each independently denote an alkyl group or a fluorine-substituted alkyl group, and at least one of $R_a$ and $R_b$ is a fluorine-substituted alkyl group.

Also, one of an exemplary embodiment of the present invention is:

A lithium ion secondary battery, comprising: a positive electrode, a negative electrode comprising a negative electrode active material, and an electrolyte liquid;

wherein the electrolyte liquid comprises a chain-type fluorinated ester compound represented by above-mentioned formula (1) and a chain-type fluorinated ether compound represented by above-mentioned formula (2); and wherein the positive electrode comprises a positive electrode active material that operates at a potential of 4.5 V or higher with respect to lithium.

Effect of the Invention

According to an exemplary aspect of the present invention, a lithium ion secondary battery which has an excellent cycle property and which has small volume increase, even in high-temperature environment, can be provided.

BRIEF DESCRIPTION OF DRAWINGS

FIG. 1 is a schematic cross-sectional view showing a structure of an electrode assembly in a stacked laminate type secondary battery.

MODE FOR CARRYING OUT THE INVENTION

As follows, an exemplary embodiment of the invention is explained in detail.

[1] Electrolyte Liquid

An electrolyte liquid in an exemplary embodiment of the invention contains a chain-type fluorinated ester compound represented by formula (1) and a chain-type fluorinated ether compound represented by formula (2). In an exemplary embodiment of the invention, it has been found that a secondary battery having an excellent cycle property and volume increase can be obtained by using an electrolyte liquid in which a fluorinated ester is present together with a fluorinated ether. This mechanism is not clear, but it is assumed to be that decomposition of the electrolyte liquid is further reduced by causing the chain-type fluorinated ether compound to be coordinated with or adsorbed in the coating formed by the chain-type fluorinated ester compound.

For example, the electrolyte liquid is constructed by adding a supporting salt to a non-aqueous solvent. In an exemplary embodiment of the invention, it is desirable that the chain-type fluorinated ester compound and the chain-type fluorinated ether compound are contained in the electrolyte liquid as a non-aqueous solvent.

There is an advantage in which the chain-type fluorinated ester compound has excellent oxidation resistance and relatively low viscosity. Therefore, the chain-type fluorinated ester compound has small influence on the lithium ion conductivity and the electrolyte liquid properties. Also, further, the chain-type fluorinated ester compound can improve the compatibility of a fluorinated ether with a carbonate compound.

The chain-type fluorinated ester compound is represented by following formula (1).

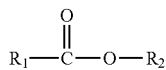

(1)

In formula (1), $R_1$ and $R_2$ each independently denote an alkyl group or a fluorine-substituted alkyl group, and at least one of $R_1$ and $R_2$ is a fluorine-substituted alkyl group.

In $R_1$ and $R_2$ in formula (1), the carbon number of the alkyl group or the fluorine-substituted alkyl group is preferably 1 to 12, is more preferably 1 to 8, is further preferably 1 to 6, and is particularly preferably 1 to 4.

The fluorine-substituted alkyl group means a substituted alkyl group having a structure in which at least one hydrogen atom of a non-substituted alkyl group is substituted by fluorine atom. Also, the alkyl group includes a straight-chain-type, a branched-chain-type, or a cyclic-chain-type one, and the fluorine-substituted alkyl group is preferably a straight-chain-type.

For example, in formula (1), $R_1$ and $R_2$ are each independently a fluorine-substituted alkyl group. Also, for example, in formula (1), $R_1$ is an alkyl group, and $R_2$ is a fluorine-substituted alkyl group. Also, for example, in formula (1), $R_1$ is a fluorine-substituted alkyl group and $R_2$ is an alkyl group.

The chain-type fluorinated ester compound is preferably a compound represented by following (I):

(I)

wherein, in formula (I), n is 1 to 4, m is 1 to 4, and $Z^1$ to $Z^4$ are each independently fluorine atom or hydrogen atom; provided that at least one of $Z^1$ to $Z^2$ is fluorine atom.

In formula (I), in the case where n is 2 or more, $Z^1$ and $Z^2$ may be each independent in each connected carbon atom. Also, in the case where m is 2 or more, $Z^3$ and $Z^4$ may be each independent in each connected carbon atom.

The chain-type fluorinated ester compound can be used alone, or in combination with two or more kinds.

The content of the chain-type fluorinated ester compound in the electrolyte liquid is not particularly limited, but is, for example, 0.01 to 30 mass %, is more preferably 0.1 to 20 mass %, and is further preferably 1 to 15 mass %. When the content of the chain-type fluorinated ester compound is 0.1 mass % or more, it is thought that the coating can be effectively formed on the surface of the negative electrode, and that decomposition of the electrolyte liquid can be more effectively reduced. Also, when the content of the chain-type fluorinated ester compound is 30 mass % or less, it is thought that internal resistance increase of the secondary battery due to excess generation of a SEI film, which is assumed to be provided by the chain-type fluorinated ester compound, can be reduced.

The chain-type fluorinated ether compound is represented by following formula (2).

$$R_a\text{—}O\text{—}R_b \qquad (2)$$

In formula (2), $R_a$ and $R_b$ each independently denote an alkyl group or a fluorine-substituted alkyl group, and at least one of $R_a$ and $R_b$ is a fluorine-substituted alkyl group.

In $R_a$ and $R_b$, the carbon number of the alkyl group is preferably 1 to 12, is more preferably 1 to 8, is further preferably 1 to 6, and is particularly preferably 1 to 4. Also, in formula (2), the alkyl group includes a straight-chain-type, a branched-chain-type, and a cyclic-type, but the alkyl group is preferably a straight-chain-type.

At least one of $R_a$ and $R_b$ is a fluorine-substituted alkyl group. The fluorine-substituted alkyl group means a substituted alkyl group having a structure in which at least one hydrogen atom of a non-substituted alkyl group is substituted by fluorine atom. Also, the fluorine-substituted alkyl group is preferably a straight-chain-type. Also, it is preferable that $R_a$ and $R_b$ are each independently a fluorine-substituted alkyl group with a carbon number of 1 to 6, and it is more preferable that they are each independently a fluorine-substituted alkyl group with a carbon number of 1 to 4.

From the standpoint of voltage resistance and compatibility with another electrolyte, the chain-type fluorinated ether is preferably a compound represented by following formula (II):

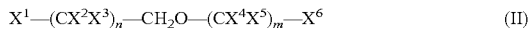

$$X^1\text{—}(CX^2X^3)_n\text{—}CH_2O\text{—}(CX^4X^5)_m\text{—}X^6 \qquad (II)$$

wherein, in formula (II), n is 1 to 8, m is 2 to 4, and $X^1$ to $X^6$ are each independently fluorine atom or hydrogen atom; provided that at least one of $X^1$ to $X^3$ is fluorine atom and at least one of $X^4$ to $X^6$ is fluorine atom.

In formula (II), in the case where n is 2 or more, $X^2$ and $X^3$ may be each independent in each connected carbon atom. In the case where m is 2 or more, $X^4$ and $X^5$ may be each independent in each connected carbon atom.

From the standpoint of voltage resistance and compatibility with another electrolyte, the chain-type fluorinated ether is preferably a compound represented by following formula (3):

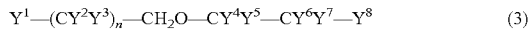

$$Y^1\text{—}(CY^2Y^3)_n\text{—}CH_2O\text{—}CY^4Y^5\text{—}CY^6Y^7\text{—}Y^8 \qquad (3)$$

wherein, in formula (3), n is 1 to 8 and $Y^1$ to $Y^8$ are each independently fluorine atom or hydrogen atom; provided that at least one of $Y^1$ to $Y^3$ is fluorine atom and that at least one of $Y^4$ to $Y^8$ is fluorine atom.

In formula (3), in the case where n is 2 or more, $Y^2$ and $Y^3$ may be each independent in each connected carbon atom.

Also, from the standpoint of viscosity of the electrolyte liquid and the compatibility with another electrolyte such as a chain-type fluorinated ester compound, the chain-type fluorinated ether compound is preferably represented by following formula (4).

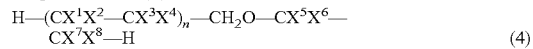

$$H\text{—}(CX^1X^2\text{—}CX^3X^4)_n\text{—}CH_2O\text{—}CX^5X^6\text{—}CX^7X^8\text{—}H \qquad (4)$$

In formula (4), n is 1, 2, 3, or 4. $X^1$ to $X^8$ are each independently fluorine atom or hydrogen atom. However, at least one of $X^1$ to $X^4$ is fluorine atom and at least one of $X^5$ to $X^8$ is fluorine atom. In the case where n is 2 or more, $X^1$ to $X^4$ may be each independent in each connected carbon atom.

In formula (4), n is preferably 1 or 2, and n is more preferably 1.

Also, in formula (4), the atom ratio of fluorine atom and hydrogen atom [(total number of fluorine atom)/(total number of hydrogen atom)] is preferably 1 or more.

Examples of the chain-type fluorinated ether compound include, for example, $CF_3OCH_3$, $CF_3OC_2H_6$, $F(CF_2)_2OCH_3$, $F(CF_2)_2OC_2H_5$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$, $H(CF_2)_2CH_2OCF_2CHFCF_3$, $CHF_2\text{—}CH_2\text{—}O\text{—}CF_2CFH\text{—}CF_3$, and $F(CF_2)_2CH_2OCF_2CFHCF_3$.

The content of the chain-type fluorinated ether compound in the electrolyte liquid is, for example, 1 to 70 mass %. Also, the content of the chain-type fluorinated ether compound is preferably 5 to 60 mass %, is more preferably 7 to 50 mass %, and is further preferably 10 to 40 mass %. When the content of the chain-type fluorinated ether compound is 60 mass % or less, the dissociation of Li ion in the supporting salt easily occur, and the electroconductivity of the electrolyte liquid is improved. Also, when the content of the chain-type fluorinated ether compound is 5 mass % or more, it is thought that reduction decomposition of the electrolyte liquid on the negative electrode is easily reduced.

Examples of the solvent which can be used as the electrolyte liquid include, for example, aprotic solvents such as: cyclic-type carbonates such as propylene carbonate (PC), ethylene carbonate (EC), butylene carbonate (BC), and vinylene carbonate (VC); chain-type carbonates such as dimethyl carbonate (DMC), diethyl carbonate (DEC), ethyl methyl carbonate (EMC), and dipropyl carbonate (DPC); propylene carbonate derivatives; and aliphatic carboxylates such as methyl formate, methyl acetate, and ethyl propionate. This aprotic solvent can be used alone, or in combination with two or more kinds.

The electrolyte liquid preferably contains a carbonate compound (non-fluorinated) as a non-aqueous solvent. By using a carbonate compound, the ion dissociation of the electrolyte liquid is improved, and viscosity of the electrolyte liquid is also decreased. Therefore, the ionic mobility can be improved.

As mentioned above, a fluorinated solvent is thought to be effective in order to reduce the gas generation. However, the fluorinated solvent generally has a low dielectric constant, and it may become difficult to dissolve a lithium salt such as $LiPF_6$ when the content of the fluorinated solvent is increased. On the other hand, a carbonate solvent is thought to be effective from the standpoint of the solubility of a lithium salt. However, the carbonate solvent may often have poor compatibility with a fluorinated solvent, which may lead to the decrease of the dissociation and the solubility of Li as well as the increase of viscosity of the electrolyte liquid. In contrast, in an exemplary embodiment of the invention, by using an electrolyte liquid containing both a chain-type fluorinated ester compound and a chain-type fluorinated ether compound in addition to a carbonate solvent, the electrolyte liquid, in which the gas generation is reduced, in which the solubility of the lithium salt is improved, and in which the compatibility of the fluorinated solvent with the carbonate solvent is excellent, can be provided. This is assumed to be because the chain-type fluorinated ester compound can improve the compatibility of the fluorinated ether with the carbonate compound. Also, there is an advantage that the chain-type fluorinated ester compound has excellent oxidation resistance and relatively low viscosity. Therefore, it is assumed that the chain-type fluorinated ester compound has small influence on the lithium ion conductivity and the electrolyte liquid properties.

Examples of the carbonate compound include cyclic-type carbonates and chain-type carbonates as mentioned above. Examples of the carbonate compound include, for example, ethylene carbonate (EC), propylene carbonate (PC), butylene carbonate (BC), vinylene carbonate (VC), dimethyl carbonate (DMC), diethyl carbonate (DEC), ethyl methyl carbonate (MEC), and dipropyl carbonate (DPC), as mentioned above. The electrolyte liquid preferably contains a carbonate compound as a main solvent. The content of the carbonate compound in the non-aqueous solvent is preferably 60 vol % or more, is more preferably 70 vol % or more, is further preferably 80 vol % or more, and is particularly preferably 90 vol % or more.

Examples of the non-aqueous solvent other than those mentioned above include, for example, γ-lactones such as γ-butyrolactone; chain-type ethers such as 1,2-ethoxyethane (DEE) and ethoxy methoxy ethane (EME); cyclic-type ethers such as tetrahydrofuran and 2-methyl tetrahydrofuran; aprotic organic solvents such as dimethylsulfoxide, 1,3-dioxolan, formamide, acetamide, dimethylformamide, dioxolane, acetonitrile, propylnitrile, nitromethane, ethyl monoglyme, phosphoric acid triesters, trimethoxy methane, dioxolane derivatives, sulfolane, methyl sulfolane, 1,3-dimethyl-2-imidazolidinone, 3-methyl-2-oxazolidinone, propylene carbonate derivatives, tetrahydrofuran derivatives, ethyl ether, 1,3-propane sultone, anisole, N-methylpyrrolidone, and fluorinated carboxylates. This can be used alone, or in combination with two or more kinds.

An electrolyte liquid in an exemplary embodiment of the invention particularly preferably contains a chain-type fluorinated ester compound, a chain-type fluorinated ether compound, and a carbonate compound as a solvent. There is an advantage that the ion dissociation of the electrolyte liquid is improved because the carbonate compound has a large dielectric constant, and that the ionic mobility is further improved because viscosity of the electrolyte liquid is decreased. However, when a carbonate compound having a carbonate structure is used as the electrolyte liquid, the carbonate compound is decomposed and a gas comprising $CO_2$ tends to be easily generated. In particular, in the case of a stacked laminate type secondary battery, if a gas is generated inside, a problem of swollenness occurs and which easily leads to decrease of a performance. In an exemplary embodiment of the invention, even if the solvent contains a carbonate compound, it has been found that the swollenness due to the gas generation is further significantly reduced by containing both a chain-type fluorinated ester compound and a chain-type fluorinated ether compound. This is thought to be because an effect of further reducing gas generation can be obtained by coexistence of a chain-type fluorinated ester compound, a chain-type fluorinated ether compound, and a carbonate compound, but this mechanism does not explicitly be understood. The chain-type fluorinated ether compound has an effect of reducing the gas generation, but it is considered that the chain-type fluorinated ether compound easily results in phase separation. It is assumed to be because the transesterification reaction of the chain-type fluorinated ester compound with a non-fluorinated chain-type or cyclic-type carbonate tends to occur, and thereby the phase separation of the chain-type fluorinated ether compound can be reduced. The effect of improving the cycle maintenance rate is also assumed to be realized by some kind of mechanism. Thus, by containing both a chain-type fluorinated ester compound and a chain-type fluorinated ether compound in an electrolyte liquid in which a carbonate compound is used as a solvent, the cycle maintenance rate is further improved and volume increase is further reduced, even in high-temperature environment. Note that, the above-mentioned consideration is only a presumption and does not limit the present invention.

In this case, it is preferable that the content of the chain-type fluorinated ester compound is 1 to 15 vol % with respect to the total amount of the chain-type fluorinated ester compound, the chain-type fluorinated ether compound, and the solvent, that the content of the chain-type fluorinated ether compound is 10 to 35 vol % with respect to the total amount of the chain-type fluorinated ester compound, the chain-type fluorinated ether compound, and the solvent, and that the content of the carbonate compound is 30 to 89 vol % with respect to the total amount of the chain-type fluorinated ester compound, the chain-type fluorinated ether compound, and the solvent. Also, the content of the chain-type fluorinated ether compound is more preferably 15 to 30 vol % with respect to the total amount of the chain-type fluorinated ester compound, the chain-type fluorinated ether compound, and the solvent. Also, the content of the carbonate compound is more preferably 50 to 80 vol % with respect to the total amount of the chain-type fluorinated ester compound, the chain-type fluorinated ether compound, and the solvent, and is further preferably 55 to 75 vol %.

More specifically, the non-aqueous solvent preferably contains a chain-type fluorinated ester compound, a chain-type fluorinated ether compound, and a carbonate compound. It is preferable that the content of the chain-type fluorinated ester compound in the non-aqueous solvent is 1 to 15 vol %, that the content of the chain-type fluorinated ether compound in the non-aqueous solvent is 10 to 45 vol %, and that the content of the carbonate compound in the non-aqueous solvent is 30 to 89 vol %. Also, the content of the chain-type fluorinated ether compound in the non-aqueous solvent is more preferably 15 to 35 vol %, and is further preferably 15 to 30 vol %. Also, the content of the carbonate compound in the non-aqueous solvent is more preferably 50 to 80 vol %, and is further preferably 55 to 75 vol %.

The electrolyte liquid can further contain a supporting salt. Examples of the supporting salt include, for example, lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$ and $LiN(CF_3SO_2)_2$. The supporting salt can be used alone, or in combination with two or more kinds. The concentration of the supporting salt in the electrolyte liquid is preferably 0.5 to 1.5 mol/l. By setting the concentration of the supporting salt to be in this range, it is easy to adjust the density, the viscosity, the electroconductivity, and the like.

[2] Negative Electrode

A lithium secondary battery of an exemplary embodiment of the invention has a negative electrode containing a negative electrode active material. The negative electrode active material can be formed on a negative electrode collector with a negative electrode binder.

A negative electrode active material in an exemplary embodiment of the invention is not particularly limited, and examples thereof include, for example, metal (a) that can be alloyed with lithium, metal oxide (b) that can absorb and desorb lithium ion, or carbon material (c) that can absorb and desorb lithium ion.

Examples of metal (a) include, for example, Al, Si, Pb, Sn, In, Bi, Ag, Ba, Ca, Hg, Pd, Pt, Te, Zn, La, or an alloy of two or more kinds thereof. Also, these metals or alloys can be used in combination with two or more kinds. Also, these metals or alloys can contain one or more non-metal element. In an exemplary embodiment of the invention, it is preferable to use silicon as the negative electrode active material. Silicon is an element whose Clarke number is second place following oxygen, and the amount of the resources is abundant. Also, the charge capacity thereof shows approximately 4200 mAh/g which is higher than another metal. Therefore, by using silicon as the negative electrode active material, a lithium ion battery, in which the weight energy density and volume energy density are excellent and the restriction regarding the resources is little, can be provided. Also, as the negative electrode active material, tin can be used, and it is preferable to use tin and silicon, and it is more preferable to use an alloy of tin and silicon. The content of metal (a) in the negative electrode active material may be 0 mass % or may be 100 mass %, but is preferably 5 mass % or more and 95 mass % or less, is more preferably 10 mass % or more and 90 mass % or less, and is further preferably 20 mass % or more and 50 mass % or less.

In the case of a negative electrode containing silicon, there was a problem that volume increase due to repeated charge and discharge was large. However, it has been found that volume change due to charge and discharge can be reduced by using an electrolyte liquid containing a chain-type fluorinated ester compound and a chain-type fluorinated ether compound. As for the mechanism of an exemplary embodiment of the invention, as mentioned above, a chain-type fluorinated ether compound is presumed to be coordinated with or be adsorbed in a coating formed by a chain-type fluorinated ester compound, thereby to further reduce decomposition of electrolyte liquid, and this phenomenon is thought to be particularly significant in a negative electrode containing silicon. Thus, in an exemplary embodiment of the invention, particular advantageous effect can be obtained by using a negative electrode containing silicon.

Examples of metal oxide (b) include, for example, silicon oxide, aluminum oxide, tin oxide, indium oxide, zinc oxide, lithium oxide, or a complex thereof. In an exemplary embodiment of the invention, silicon oxide is preferably used as the negative electrode active material. This is because silicon oxide is relatively stable and it is difficult for silicon oxide to cause a reaction with another compound. Also, one element or two or more elements selected from nitrogen, boron and sulfur can be added to metal oxide (b), for example, in an amount of 0.1 to 5 mass %. By this, the electroconductivity of metal oxide (b) can be improved. The content of metal oxide (b) in the negative electrode active material may be 0 mass % or may be 100 mass %, but is preferably 5 mass % or more and 90 mass % or less, is more preferably 40 mass % or more and 80 mass % or less, and is further preferably 50 mass % or more and 70 mass % or less.

Examples of carbon material (c) include, for example, carbon, amorphous carbon, diamond-like carbon, carbon nanotube, or a complex thereof. Here, the carbon having a high crystallinity has a high electroconductivity and an excellent adhesiveness with a negative electrode collector consisting of copper or the like as well as an excellent voltage flatness. On the other hand, since the amorphous carbon having a low crystallinity has relatively low volume expansion, there is a high effect of reducing volume expansion of the whole of the negative electrode, and deterioration due to ununiformity such as a crystal grain boundary or a defect hardly occurs. The content of carbon material (c) in the negative electrode active material may be 0 mass % or may be 100 mass %, but is preferably 2 mass % or more and 50 mass % or less, and is more preferably 2 mass % or more and 30 mass % or less.

An negative electrode active material in an exemplary embodiment of the invention preferably contains metal (a) that can be alloyed with lithium, metal oxide (b) that can absorb and desorb lithium ion, and carbon material (c) that can absorb and desorb lithium ion. Also, it is preferable that metal (a) is silicon and metal oxide (b) is silicon oxide. Also, the negative electrode active material preferably comprises a complex of silicon, silicon oxide, and carbon material (hereinafter, referred to as Si/SiO/C complex). Further, all or a part of metal oxide (b) preferably has an amorphous structure. Metal oxide (b) having an amorphous structure can reduce volume expansion of carbon material (c) or metal (a) that are another negative electrode active material. This mechanism is not obvious, but the amorphous structure of metal oxide (b) is presumed to have some influences on a coating formation at an interface between carbon material (c) and an electrolyte liquid. Also, the amorphous structure has relatively small constituent due to ununiformity such as a crystal grain boundary or a defect. Note that, it can be confirmed by X-ray diffraction measurement (general XRD measurement) that all or a part of metal oxide (b) has an amorphous structure. Specifically, in the case where metal oxide (b) does not have an amorphous structure, a peak peculiar to metal oxide (b) is observed, while in the case where all or a part of metal oxide (b) has an amorphous structure, a observed peak peculiar to metal oxide (b) becomes broad.

As mentioned above, in an exemplary embodiment of the invention, particular advantageous effect can be obtained by using a negative electrode containing silicon. However, the negative electrode active material containing silicon preferably contains silicon as metal (a), silicon oxide as metal oxide (b), and carbon material (c), and is more preferably a Si/SiO/C complex. By using a negative electrode active material containing silicon, silicon oxide, and carbon material, and by using an electrolyte liquid of an exemplary embodiment of the invention, a secondary battery, which has an effect of improving the cycle property and the ratio of volume increase as mentioned above as well as which is excellent in the resistance change ratio, can be obtained. For example, specifically, in an exemplary embodiment of the invention, by using a negative electrode active material comprised of a Si/SiO/C complex, and by using an electrolyte liquid containing a chain-type fluorinated ester compound and a chain-type fluorinated ether compound, a secondary battery which is excellent in cycle property, volume increase, and resistance change ratio can be obtained.

In a Si/SiO/C complex, all or a part of silicon is preferably dispersed in silicon oxide. The dispersion of at least a part of silicon in silicon oxide can further reduce volume expansion of the negative electrode as a whole and can also reduce decomposition of an electrolyte liquid. Note that, it can be confirmed by transmission electron microscope observation (general TEM observation) together with energy dispersive X-ray spectroscopy measurement (general EDX measurement) that all or a part of silicon is dispersed in silicon oxide. Specifically, a section of a specimen containing silicon particle is observed and an oxygen atom concentration of silicon particle which is dispersed in silicon oxide is measured, and thereby it can be confirmed that it does not become an oxide.

For example, in a Si/SiO/C complex, all or a part of silicon oxide has an amorphous structure and all or a part of silicon is dispersed in silicon oxide. This Si/SiO/C complex can be produced, for example, by a method disclosed in Patent Document 3 (JP 2004-47404 A). That is, a CVD processing of silicon oxide is carried out in an atmosphere containing an organic substance gas such as methane gas, to obtain a Si/SiO/C complex. The Si/SiO/C complex obtained by this method has a structure in which the surface of a particle which comprises silicon oxide containing silicon is covered with carbon. Also, silicon is a nanocluster in silicon oxide.

In a Si/SiO/C complex, the ratio of silicon, silicon oxide, and carbon material is not particularly limited. The content of silicon is preferably 5 mass % more and 90 mass % or less with respect to the Si/SiO/C complex, and is preferably 20 mass % more and 50 mass % or less. The content of silicon oxide is preferably 5 mass % more and 90 mass % or less with respect to the Si/SiO/C complex, and is preferably 40 mass % more and 70 mass % or less. The content of carbon material is preferably 2 mass % more and 50 mass % or less with respect to the Si/SiO/C complex, and is preferably 2 mass % more and 30 mass % or less.

Also, a Si/SiO/C complex can comprise a mixture of silicon, silicon oxide, and carbon material, and can also be produced by mixing metal (a), metal oxide (b), and carbon material (c) by mechanical milling. For example, a Si/SiO/C complex can be obtained by mixing silicon, silicon oxide, and carbon material mix which are respectively in a particle state. For example, the average particle diameter of silicon can be constituted in a range smaller than the average particle diameter of carbon material and the average particle diameter of silicon oxide. By this constitution, since silicon in which volume change associated with charge and discharge is small has a relatively small particle diameter, and since carbon material and silicon oxide in which volume change is large has a relatively large particle diameter, the dendrite generation and the pulverization of alloy are more effectively reduced. Also, in the process of charge and discharge, lithium is absorbed and desorbed from the larger diameter particle, the smaller diameter particle and the larger diameter particle in this order. From this point, the residual stress and the residual strain are reduced. The average particle diameter of silicon can be, for example, 20 μm or less, and is preferably 15 μm or less. Also, it is preferable that the average particle diameter of metal oxide (b) is a half or less of the average particle diameter of carbon material (c), and it is preferable that the average particle diameter of metal (a) is a half or less of the average particle diameter of metal oxide (b). Further, it is more preferable that the average particle diameter of metal oxide (b) is a half or less of the average particle diameter of carbon material (c) as well as that the average particle diameter of metal (a) is a half or less of the average particle diameter of metal oxide (b). The control of the average particle diameter in this range can more effectively give the relaxation effect of volume expansion of the metal and alloy phase, and can provide a secondary battery having an excellent balance of an energy density, a cycle life, and an efficiency. More specifically, it is preferable that the average particle diameter of silicon oxide (b) is a half or less of the average particle diameter of graphite (c) and that the average particle diameter of silicon (a) is a half or less of the average particle diameter of silicon oxide (b). Also, more specifically, the average particle diameter of silicon (a) can be, for example, 20 μm or less, and is preferably 15 μm or less.

A negative electrode binder is not particularly limited, but a polyvinylidene fluoride, a vinylidene fluoride-hexafluoropropylene copolymer, a vinylidene fluoride-tetrafluoroethylene copolymer, a styrene-butadiene copolymerized rubber, a polytetrafluoroethylene, a polypropylene, a polyethylene, a polyimide, a polyamide-imide, a polyacrylic acid, or the like can be used. Among these, from the strong binding property, a polyimide or a polyamide-imide is preferable. The amount of the negative electrode binder used is preferably 5 to 25 parts by mass with respect to 100 parts by mass of the negative electrode active material, from the standpoint of "sufficient binding force" and "high energy" which are trade-offs.

A negative electrode collector is preferably aluminum, nickel, stainless steel, chromium, copper, silver, and an alloy thereof from the electrochemical stability. Examples of the shape thereof include foil, flat plate, and mesh.

A negative electrode can be produced by forming a negative electrode active material layer containing a negative electrode active material and a negative electrode binder on a negative electrode collector. Examples of the method for forming the negative electrode active material layer include doctor blade method, die coater method, CVD method, and sputtering method. A negative electrode active material layer may be first formed, and a thin film of aluminum, nickel, or an alloy thereof may thereafter be formed by vapor deposition, sputtering, or the like to be a negative electrode.

[3] Positive Electrode

A positive electrode is formed, for example, by binding a positive electrode active material on a positive electrode collector with a positive electrode binder so that the positive electrode active material covers the positive electrode collector.

Examples of the positive electrode active material include lithium manganates having a lamellar structure or lithium manganates having a spinel structure such as $LiMnO_2$ and $Li_xMn_2O_4$ (0<x<2); $LiCoO_2$, $LiNiO_2$, or compounds in which a part of the transition metal thereof are substituted by another metal; lithium transition metal oxides such as $LiNi_{1/3}CO_{1/3}Mn_{1/3}O_2$ in which the molar ratio of a particular transition metal is not more than one half; and compounds which have lithium at a larger amount than the stoichiometric amount in these lithium transition metal oxides. In particular, $Li_\alpha Ni_\beta Co_\gamma Al_\delta O_2$ (1≤α≤1.2, β+γ+δ=1, β≥0.7, and γ≤0.2) or $Li_\alpha Ni_\beta Co_\gamma Mn_\delta O_2$ (1≤α≤1.2, β+γ+δ=1, β≥0.6, and γ≤0.2) is preferable. The positive electrode active material can be used alone, or in combination with two or more kinds.

From the standpoint of realizing high voltage, it is preferable to use an active material operating at a potential of 4.5

V or higher with respect to lithium (hereinafter, also referred to as 5 V class active material) as the positive electrode active material. In the case of using a 5 V class active material, the gas generation due to decomposition of the electrolyte liquid or the like occurs easily. However, by using an electrolyte liquid of an exemplary embodiment of the invention together, the gas generation can be reduced and the improvement of the cycle property can be realized. The reason is presumed, but should not limit the present invention, to be as follows. There is an advantage that the chain-type fluorinated ester compound has excellent oxidation resistance and relatively low viscosity. Therefore, the chain-type fluorinated ester compound has small influence on the lithium ion conductivity and the electrolyte liquid properties. Also, further, the chain-type fluorinated ester compound can improve the compatibility of a fluorinated ether with a carbonate compound. Therefore, the reduction of the gas generation and the improvement of the cycle property in the case of using a 5 V grade active material can be realized.

For example, as the 5 V class positive electrode active material, a lithium manganese complex oxide represented by following formula (A) can be used:

$$Li_a(M_xMn_{2-x-y}Y_y)(O_{4-w}Z_w) \tag{A}$$

wherein, in formula (A), x, y, a, and w satisfy $0.4 \leq x \leq 1.2$, $0 \leq y$, $x+y<2$, $0 \leq a \leq 1.2$ and $0 \leq w \leq 1$, M is at least one selected from the group consisting of Co, Ni, Fe, Cr, and Cu, Y is at least one selected from the group consisting of Li, B, Na, Mg, Al, Ti, Si, K, and Ca, and Z is at least one selected from the group consisting of F and Cl.

Also, among these complex oxides, from the viewpoint of obtaining sufficient capacity and providing high operating life, it is preferable to use a spinel type compound represented by following formula (B) as the 5 V class positive electrode active material:

$$LiNi_xMn_{2-x-y}A_yO_4 \tag{B}$$

wherein, in formula (B), x and y satisfy $0.4<x<0.6$ and $0 \leq y<0.3$, and A is at least one selected from the group consisting of Li, B, Na, Mg, Al, Ti, and Si.

In formula (B), y preferably satisfies $0 \leq y<0.2$.

Also, examples of the positive electrode active material operating at a potential of 4.5 V or higher with respect to lithium include olivine type positive electrode active materials. Examples of the olivine type 5 V active material include, for example, $LiCoPO_4$ or $LiNiPO_4$.

Also, examples of the positive electrode active material operating at a potential of 4.5 V or higher with respect to lithium include Si complex oxides. Examples of the Si complex oxide include, for example, compounds represented by following formula (C):

$$Li_2MSiO_4 \tag{C}$$

wherein, in formula (C), M is at least one selected from the group consisting of Mn, Fe, and Co.

Also, the positive electrode active material operating at a potential of 4.5 V or higher with respect to lithium may have a layer structure. Examples of the 5 V class active material having a layer structure include, for example, compounds represented by following formula (D):

$$Li(M1_xM2_yMn_{2-x-y})O_2 \tag{D}$$

wherein, in formula (D), M1 is at least one selected from the group consisting of Ni, Co, and Fe, M2 is at least one selected from the group consisting of Li, Mg, and Al, and x and y satisfy $0.1<x<0.5$ and $0.05<y<0.3$.

It is preferable to use a lithium metal complex oxide represented by following formulae (E) to (G) as a 5 V grade active material:

$$LiMPO_4 \tag{E}$$

wherein, in formula (E), M is at least one selected from the group consisting of Co and Ni;

$$Li(M_yMn_z)O_2 \tag{F}$$

wherein, in formula (F), y and z satisfy $0.1 \leq y \leq 0.5$ and $0.7 \geq z \geq 0.33$, and M is at least one selected from the group consisting of Li, Co, and Ni; and $$Li(Li_xM_yMn_z)O_2 \tag{G}$$

wherein, in formula (G), x, y, and z satisfy $0.3>x \geq 0.1$, $0.1 \leq y \leq 0.4$, and $0.7 \geq z \geq 0.33$, and M is at least one selected from the group consisting of Li, Co, and Ni.

As a positive electrode binder, the same materials as a negative electrode binder can be used. Among these, from the standpoint of versatility and low cost, polyvinylidene fluorides are preferable. The amount of the positive electrode binder used is preferably 2 to 10 parts by mass with respect to 100 parts by mass of the positive electrode active material from the standpoint of "sufficient binding force" and "high energy" which are trade-off to each other.

As a positive electrode collector, the same materials for a negative electrode collector can be used.

For the purpose of reducing the impedance, an electroconductive auxiliary material may be added to a positive electrode active material layer containing a positive electrode active material. Examples of the electroconductive auxiliary material include carbonaceous fine particles such as graphite, carbon black, and acetylene black.

[4] Separator

As a separator, a porous film or a nonwoven cloth of a polypropylene, a polyethylene, or the like can be used. A separator in which these are stacked can also be used.

[5] Package

A package can be appropriately selected as long as it is stable against an electrolyte liquid and it has a sufficient water vapor barrier property. For example, in the case of a stacked laminate type secondary battery, lamination films of a polypropylene, a polyethylene, or the like which are coated with aluminum or silica can be used as a package. In particular, it is preferable to use an aluminum lamination film from the standpoint of reducing volume expansion.

In the case of a secondary battery in which a lamination film is used as a package, when a gas is generated, a distortion of the electrode assembly becomes much larger than in the case of a secondary battery in which a metal can is used as a package. This is because the lamination film is easily deformed by the inner pressure of the secondary battery in comparison with the metal can. Further, in the case of the secondary battery in which a lamination film is used as a package, when it is sealed, the inner pressure of the battery is generally set to be lower than atmospheric pressure. Thus, the battery does not have extra space inside, which is easy to directly result in volume change of the battery and a deformation of the electrode assembly when a gas is generated.

However, a secondary battery according to an exemplary embodiment of the invention can overcome the abovementioned problem. As a result, a stacked laminate type lithium ion secondary battery which is low price and which is superior in that there is more latitude to increase cell capacity by changing the number of laminations can be provided.

[6] Secondary Battery

The constitution of a secondary battery according to an exemplary embodiment of the invention is not particularly limited, and can be a constitution, for example, where an electrode assembly in which a positive electrode and a negative electrode are oppositely disposed and an electrolyte liquid are enclosed inside a package. A shape of the secondary battery is not particularly limited, but examples thereof include, for example, a cylindrical type, a flat wound rectangular type, a stacked rectangular type, a coin type, a flat wound laminate type, and a stacked laminate type.

As follows, a stacked laminate type secondary battery is explained as an example. FIG. 1 is a schematic cross-sectional view showing a structure of an electrode assembly in a stacked laminate type secondary battery. This electrode assembly is formed by alternately stacking plural positive electrodes c and plural negative electrodes a with separator b placed therebetween. Positive electrode collector e in each positive electrode c is electrically connected by being welded to one another at the end part thereof which is not covered with a positive electrode active material, and further positive electrode terminal f is welded to the welded part. Negative electrode collector d in each negative electrode a is electrically connected by being welded to one another at the end part thereof which is not covered with a negative electrode active material, and further negative electrode terminal g is welded to the welded part.

Since an electrode assembly having such a planar stacked structure has no portion of a small R (a region near a winding core of a wound structure), there is an advantage that it is less adversely affected by volume change of the electrode with the charge and discharge cycle than in the case of an electrode assembly having a wound structure. Therefore, it is useful for an electrode assembly using an active material in which volume expansion is liable to occur. However, in the electrode assembly having a planar stacked structure, when a gas is generated between the electrodes, the generated gas may easily accumulate between the electrodes. This is because, in the case of the electrode assembly having a stacked structure, it is easy to extend the space between the electrodes, while, in the case of the electrode assembly having a wound structure, the electrodes are tensioned therebetween and thereby the space between the electrodes is hard to be extended. In the case where the package is an aluminum lamination film, this problem becomes particularly significant. An exemplary embodiment of the invention can solve the above-mentioned problem, and can provide a stacked laminate type lithium ion secondary battery using a high energy type negative electrode, which enables long-life operation thereof.

EXAMPLES

As follows, an exemplary embodiment of the invention is more concretely explained by the Examples.

Example 1

<Negative Electrode>

A silicon simple substance, whose average particle diameter D50 measured by laser diffraction and scattering method was adjusted so as to be 5 μm, was used as a negative electrode active material. This negative electrode active material, a polyamide-imide (produced by TOYOBO CO., LTD., trade name: VYLOMAX (registered trade mark)) as a negative electrode binder, and acetylene black as an electroconductive auxiliary material were weighed at a mass ratio of 75:20:5, and they were mixed with n-methylpyrrolidone to prepare a negative electrode slurry. The negative electrode slurry was applied to a copper foil having a thickness of 10 μm and was then dried, and it was further heat-treated in nitrogen atmosphere at 300° C. to produce a negative electrode.

<Positive Electrode>

A lithium nickelate ($LiNi_{0.80}Co_{0.15}Al_{0.05}O_2$) as a positive electrode active material, carbon black as an electroconductive auxiliary material, and a polyvinylidene fluoride as a positive electrode binder were weighed at a mass ratio of 90:5:5. Then, these materials were mixed with n-methylpyrrolidone to prepare a positive electrode slurry. The positive electrode slurry was applied to an aluminum foil having a thickness of 20 μm and was then dried, and it was further pressed to produce a positive electrode.

<Electrode Assembly>

Three layers of the positive electrode obtained and four layers of the negative electrode obtained were alternately stacked with a polypropylene porous film as a separator placed therebetween. End parts of the positive electrode collectors which were not covered with the positive electrode active material and end parts of the negative electrodes collectors which were not covered with the negative electrode active material were respectively welded. Further, an aluminum positive electrode terminal and a nickel negative electrode terminal were respectively welded to the welded parts, to obtain an electrode assembly which had a planar stacked structure.

<Electrolyte Liquid>

A carbonate non-aqueous solvent, a chain-type fluorinated ester compound represented by formula (1) ($R^1$=$CH_3$—, $R^2$=$CH_2F$—), and a chain-type fluorinated ether compound represented by formula (2) (H—$CF_2CF_2$—$CH_2O$—$CF_2CF_2$—H) were mixed at 70:10:20 (volume ratio) to prepare a mixed solvent. $LiPF_6$ as a supporting salt was added to the mixed solvent at a concentration of 1 mol/l to prepare an electrolyte liquid. Note that, a solvent of EC/PC/DMC/EMC/DEC=20/20/20/20/20 (volume ratio) was used as the carbonate non-aqueous solvent. Note that, in TABLES and hereinafter, the chain-type fluorinated ether compound (H—$CF_2CF_2$—$CH_2O$—$CF_2CF_2$—H) is abbreviated as FET1. Note that, in the mixed solvent prepared, the content of the chain-type fluorinated ester compound is 10 vol %, and the content of the chain-type fluorinated ether compound is 20 vol %.

<Secondary Battery>

The above-mentioned electrode assembly was enclosed in an aluminum lamination film as a package and the electrolyte liquid was supplied to the inside. Then, it was sealed with depressurizing it to 0.1 atm to produce a secondary battery.

<Evaluation>

(Cycle Property, Volume Increase, and Resistance Change Ratio at 55° C.)

A test, in which the secondary battery produced was repeatedly charged and discharged within a voltage range of 2.5 V to 4.1 V in a thermostatic oven kept at a temperature of 55° C., was carried out to evaluate the cycle maintenance rate (%), volume increase (%), and the resistance change ratio (%). As for the charge, it was charged at 1 C to 4.1 V and the constant voltage charge was then carried out for 2.5 hours in total. As for the discharge, the constant current discharge was carried out at 1 C to 2.5 V. The results are shown in TABLE 1.

"Cycle maintenance rate (%)" is calculated by (discharge capacity after 50 cycles)/(discharge capacity after 5 cycles)×100 (unit: %).

"Volume increase (%)" is calculated by {(volume after 50 cycles)/(volume before cycle)−1}×100 (unit: %).

"Resistance change ratio (%)" is calculated by {(resistance value after 55 cycles)/(initial resistance value)}×100 (unit: %). The initial resistance value is a resistance value in a discharged condition before cycle. The resistance was measured with AC m-ohm HiTESTER 3560 made by HIOKI.

Examples 2 to 26

Secondary batteries were produced and evaluated in the same manner as in Example 1 except that a compound described in TABLE 1 was used as the chain-type fluorinated ester compound. The results are shown in TABLE 1.

Comparative Example 1

A secondary battery was produced and evaluated in the same manner as in Example 1 except that the chain-type fluorinated ester compound and the chain-type fluorinated ether compound were not used. The results are shown in TABLE 1.

Comparative Example 2

A secondary battery was produced and evaluated in the same manner as in Example 7 except that the chain-type fluorinated ether compound was not used and that a mixed solvent obtained by mixing the carbonate non-aqueous solvent and the chain-type fluorinated ester compound at 90:10 (volume ratio) was used. The results are shown in TABLE 1.

Comparative Example 3

A secondary battery was produced and evaluated in the same manner as in Example 1 except that the chain-type fluorinated ester compound was not used and that a mixed solvent obtained by mixing the carbonate non-aqueous solvent and the chain-type fluorinated ether compound at 80:20 (volume ratio) was used. The results are shown in TABLE 1.

TABLE 1

| | electrolyte liquid | | | | | negative electrode | | | | | |
|---|---|---|---|---|---|---|---|---|---|---|---|
| | chain-type fluorinated ester | | | chain-type fluorinated ether | | negative electrode | binder resin | | cycle maintenance rate (%) | volume increase (%) | resistance change ratio (%) |
| | R1 | R2 | content (%) | kind | content (%) | active material | kind | content (%) | | | |
| Comp. Ex. 1 | — | — | — | — | — | Si | PAI | 15 | 20 | 48.3 | 553 |
| Comp. Ex. 2 | CHF2— | CHF2— | 10 | — | — | Si | PAI | 15 | 35 | 40.4 | 291 |
| Comp. Ex. 3 | — | — | — | FET1 | 20 | Si | PAI | 15 | 41 | 13.1 | 301 |
| Ex. 1 | CH3— | CH2F— | 10 | FET1 | 20 | Si | PAI | 15 | 48 | 8.0 | 252 |
| Ex. 2 | CH3— | CHF2— | 10 | FET1 | 20 | Si | PAI | 15 | 51 | 6.9 | 255 |
| Ex. 3 | CH3— | CH2FCH2— | 10 | FET1 | 20 | Si | PAI | 15 | 47 | 9.3 | 246 |
| Ex. 4 | CH3— | CHF2CH2— | 10 | FET1 | 20 | Si | PAI | 15 | 49 | 8.1 | 242 |
| Ex. 5 | CHF2— | CH3— | 10 | FET1 | 20 | Si | PAI | 15 | 52 | 8.5 | 251 |
| Ex. 6 | CHF2— | CH2F— | 10 | FET1 | 20 | Si | PAI | 15 | 53 | 7.5 | 241 |
| Ex. 7 | CHF2— | CHF2— | 10 | FET1 | 20 | Si | PAI | 15 | 56 | 6.9 | 236 |
| Ex. 8 | CHF2— | CH3CH2— | 10 | FET1 | 20 | Si | PAI | 15 | 48 | 7.1 | 242 |
| Ex. 9 | CHF2— | CH2FCH2— | 10 | FET1 | 20 | Si | PAI | 15 | 54 | 8.4 | 240 |
| Ex. 10 | CHF2— | CHF2CH2— | 10 | FET1 | 20 | Si | PAI | 15 | 56 | 6.4 | 228 |
| Ex. 11 | CH3CH2— | CH2F— | 10 | FET1 | 20 | Si | PAI | 15 | 45 | 9.1 | 256 |
| Ex. 12 | CH3CH2— | CHF2— | 10 | FET1 | 20 | Si | PAI | 15 | 46 | 6.6 | 251 |
| Ex. 13 | CH3CH2— | CH2FCH2— | 10 | FET1 | 20 | Si | PAI | 15 | 45 | 9.2 | 233 |
| Ex. 14 | CH3CH2— | CHF2CH2— | 10 | FET1 | 20 | Si | PAI | 15 | 50 | 7.1 | 238 |
| Ex. 15 | CHF2CH2— | CH3— | 10 | FET1 | 20 | Si | PAI | 15 | 47 | 6.4 | 242 |
| Ex. 16 | CHF2CH2— | CH2F— | 10 | FET1 | 20 | Si | PAI | 15 | 54 | 7.2 | 248 |
| Ex. 17 | CHF2CH2— | CHF2— | 10 | FET1 | 20 | Si | PAI | 15 | 58 | 5.9 | 231 |
| Ex. 18 | CHF2CH2— | CH3CH2— | 10 | FET1 | 20 | Si | PAI | 15 | 47 | 7.9 | 225 |
| Ex. 19 | CHF2CH2— | CH2FCH2— | 10 | FET1 | 20 | Si | PAI | 15 | 55 | 8.1 | 239 |
| Ex. 20 | CHF2CH2— | CHF2CH2— | 10 | FET1 | 20 | Si | PAI | 15 | 57 | 6.3 | 228 |
| Ex. 21 | CH3CF2— | CH3— | 10 | FET1 | 20 | Si | PAI | 15 | 49 | 9.1 | 251 |
| Ex. 22 | CH3CF2— | CH2F— | 10 | FET1 | 20 | Si | PAI | 15 | 53 | 7.2 | 238 |
| Ex. 23 | CH3CF2— | CHF2— | 10 | FET1 | 20 | Si | PAI | 15 | 54 | 6.8 | 245 |
| Ex. 24 | CH3CF2— | CH3CH2— | 10 | FET1 | 20 | Si | PAI | 15 | 49 | 8.5 | 258 |
| Ex. 25 | CH3CF2— | CH2FCH2— | 10 | FET1 | 20 | Si | PAI | 15 | 51 | 8.9 | 251 |
| Ex. 26 | CH3CF2— | CHF2CH2— | 10 | FET1 | 20 | Si | PAI | 15 | 55 | 6.3 | 244 |

Example 27

A secondary battery was produced and evaluated in the same manner as in Example 1 except that a Si/SiO/C complex (CVD method) was used as the negative electrode active material instead of the silicon simple substance. The results are shown in TABLE 1.

The Si/SiO/C complex (CVD method) was obtained by carrying out CVD processing in an atmosphere containing methane gas at 1150° C. for 6 hours. The Si/SiO/C complex had a structure in which particles comprising a silicon and a silicon oxide were covered with carbon. Also, the silicon was a nanocluster in the silicon oxide. Also, the mass ratio of Si/SiO/C was adjusted so that it was approximately 29/61/10. The average particle diameter $D_{50}$ of the Si/SiO/C complex was approximately 5 µm.

Examples 28 to 52

Secondary batteries were produced and evaluated in the same manner as in Example 27 except that a compound described in TABLE 2 was used as the chain-type fluorinated ester compound. The results are shown in TABLE 2.

Example 53

A secondary battery was produced and evaluated in the same manner as in Example 7 except that an Si—Sn alloy was used as the negative electrode active material instead of the silicon simple substance. The results are shown in TABLE 3. The average particle diameter $D_{50}$ of the Si—Sn alloy was approximately 5 µm. The Si—Sn alloy was obtained by mixing metal Si particle with an average particle diameter D50 of approximately 7 µm and metal Sn particle with an average particle diameter D50 of approximately 7 µm by so-called mechanical milling method for 8 h.

Examples 54 to 56

Secondary batteries were produced and evaluated in the same manner as in Example 53 except that a compound described in TABLE 3 was used as the chain-type fluorinated ester compound. The results are shown in TABLE 3.

Example 57

A secondary battery was produced and evaluated in the same manner as in Example 20 except that a Si/SiO/C complex (mechanical method) was used as the negative electrode active material instead of the silicon simple substance. The results are shown in TABLE 3.

The Si/SiO/C complex (mechanical method) was produced by the following methods. First, a silicon with an average particle diameter of 5 µm, an amorphous silicon oxide ($SiO_x$, $0<x\leq2$) with an average particle diameter of 13 µm, and a graphite with an average particle diameter of 30 µm were weighed at a mass ratio of 29:61:10. And, these materials were mixed by so-called mechanical milling for 24 hours to obtain a Si/SiO/C complex (mechanical method). Note that, in this negative electrode active material, the silicon was dispersed in the silicon oxide ($SiO_x$, $0<x\leq2$).

Example 58

A secondary battery was produced and evaluated in the same manner as in Example 46 except that a polyimide (produced by UBE INDUSTRIES, trade name: U varnish A) was used as the binder resin. The results are shown in TABLE 3.

TABLE 2

| | electrolyte liquid | | | | | negative electrode | | | | | |
|---|---|---|---|---|---|---|---|---|---|---|---|
| | chain-type fluorinated ester | | | chain-type fluorinated ether | | negative electrode | binder resin | | cycle maintenance | volume increase | resistance change |
| | R1 | R2 | content (%) | kind | content (%) | active material | kind | content (%) | rate (%) | (%) | ratio (%) |
| Ex. 27 | CH3— | CH2F— | 10 | FET1 | 20 | Si/SiO/C | PAI | 15 | 76 | 3.5 | 163 |
| Ex. 28 | CH3— | CHF2— | 10 | FET1 | 20 | Si/SiO/C | PAI | 15 | 79 | 2.7 | 158 |
| Ex. 29 | CH3— | CH2FCH2— | 10 | FET1 | 20 | Si/SiO/C | PAI | 15 | 75 | 3.6 | 152 |
| Ex. 30 | CH3— | CHF2CH2— | 10 | FET1 | 20 | Si/SiO/C | PAI | 15 | 80 | 2.3 | 145 |
| Ex. 31 | CHF2— | CH3— | 10 | FET1 | 20 | Si/SiO/C | PAI | 15 | 79 | 2.5 | 153 |
| Ex. 32 | CHF2— | CH2F— | 10 | FET1 | 20 | Si/SiO/C | PAI | 15 | 83 | 2.8 | 142 |
| Ex. 33 | CHF2— | CHF2— | 10 | FET1 | 20 | Si/SiO/C | PAI | 15 | 85 | 1.6 | 140 |
| Ex. 34 | CHF2— | CH3CH2— | 10 | FET1 | 20 | Si/SiO/C | PAI | 15 | 78 | 2.4 | 146 |
| Ex. 35 | CHF2— | CH2FCH2— | 10 | FET1 | 20 | Si/SiO/C | PAI | 15 | 84 | 1.9 | 161 |
| Ex. 36 | CHF2— | CHF2CH2— | 10 | FET1 | 20 | Si/SiO/C | PAI | 15 | 85 | 1.6 | 141 |
| Ex. 37 | CH3CH2— | CH2F— | 10 | FET1 | 20 | Si/SiO/C | PAI | 15 | 74 | 3.1 | 162 |
| Ex. 38 | CH3CH2— | CHF2— | 10 | FET1 | 20 | Si/SiO/C | PAI | 15 | 75 | 3.2 | 158 |
| Ex. 39 | CH3CH2— | CH2FCH2— | 10 | FET1 | 20 | Si/SiO/C | PAI | 15 | 74 | 3.5 | 145 |
| Ex. 40 | CH3CH2— | CHF2CH2— | 10 | FET1 | 20 | Si/SiO/C | PAI | 15 | 78 | 2.5 | 138 |
| Ex. 41 | CHF2CH2— | CH3— | 10 | FET1 | 20 | Si/SiO/C | PAI | 15 | 76 | 2.6 | 148 |
| Ex. 42 | CHF2CH2— | CH2F— | 10 | FET1 | 20 | Si/SiO/C | PAI | 15 | 83 | 2.3 | 153 |
| Ex. 43 | CHF2CH2— | CHF2— | 10 | FET1 | 20 | Si/SiO/C | PAI | 15 | 87 | 1.8 | 142 |
| Ex. 44 | CHF2CH2— | CH3CH2— | 10 | FET1 | 20 | Si/SiO/C | PAI | 15 | 75 | 2.5 | 152 |
| Ex. 45 | CHF2CH2— | CH2FCH2— | 10 | FET1 | 20 | Si/SiO/C | PAI | 15 | 84 | 1.5 | 149 |
| Ex. 46 | CHF2CH2— | CHF2CH2— | 10 | FET1 | 20 | Si/SiO/C | PAI | 15 | 87 | 1.5 | 142 |
| Ex. 47 | CH3CF2— | CH3— | 10 | FET1 | 20 | Si/SiO/C | PAI | 15 | 76 | 3.2 | 159 |
| Ex. 48 | CH3CF2— | CH2F— | 10 | FET1 | 20 | Si/SiO/C | PAI | 15 | 81 | 2.8 | 142 |
| Ex. 49 | CH3CF2— | CHF2— | 10 | FET1 | 20 | Si/SiO/C | PAI | 15 | 84 | 2.2 | 150 |
| Ex. 50 | CH3CF2— | CH3CH2— | 10 | FET1 | 20 | Si/SiO/C | PAI | 15 | 78 | 3.6 | 156 |
| Ex. 51 | CH3CF2— | CH2FCH2— | 10 | FET1 | 20 | Si/SiO/C | PAI | 15 | 80 | 3.2 | 148 |
| Ex. 52 | CH3CF2— | CHF2CH2— | 10 | FET1 | 20 | Si/SiO/C | PAI | 15 | 85 | 2.5 | 149 |

TABLE 3

| | chain-type fluorinated ester | | | chain-type fluorinated ether | | negative electrode | binder resin | | cycle maintenance rate (%) | volume increase (%) | resistance change ratio (%) |
|---|---|---|---|---|---|---|---|---|---|---|---|
| | R1 | R2 | content (%) | kind | content (%) | active material | kind | content (%) | | | |
| Ex. 53 | CHF2— | CHF2— | 10 | FET1 | 20 | Si—Sn alloy | PAI | 15 | 68 | 7.2 | 248 |
| Ex. 54 | CHF2— | CHF2CH2— | 10 | FET1 | 20 | Si—Sn alloy | PAI | 15 | 71 | 7.8 | 238 |
| Ex. 55 | CHF2CH2— | CHF2— | 10 | FET1 | 20 | Si—Sn alloy | PAI | 15 | 70 | 6.3 | 251 |
| Ex. 56 | CHF2CH2— | CHF2CH2— | 10 | FET1 | 20 | Si—Sn alloy | PAI | 15 | 72 | 6.6 | 242 |
| Ex. 57 | CHF2CH2— | CHF2CH2— | 10 | FET1 | 20 | Si/SiO/C (Mechanical) | PAI | 15 | 78 | 3.5 | 162 |
| Ex. 58 | CHF2CH2— | CHF2CH2— | 10 | FET1 | 20 | Si/SiO/C | PI | 15 | 81 | 2.5 | 142 |

Examples 59 to 63

Secondary batteries were produced and evaluated in the same manner as in Example 46 except that the content (vol %) of the chain-type fluorinated ether compound (FET1) in the mixed solvent was set to be a value shown in TABLE 4. The results are shown in TABLE 4. Note that, in the TABLE, the chain-type fluorinated ester compound ($R_1$=CHF$_2$CH$_2$—, $R_2$=CHF$_2$CH$_2$—) is also abbreviated as FES1.

TABLE 4

| | chain-type fluorinated ester | | chain-type fluorinated ether | | negative electrode | binder resin | | cycle maintenance rate (%) | volume increase (%) | resistance change ratio (%) |
|---|---|---|---|---|---|---|---|---|---|---|
| | kind | content (%) | kind | content (%) | active material | kind | content (%) | | | |
| Ex. 59 | FES1 | 10 | FET1 | 5 | Si/SiO/C | PAI | 15 | 74 | 4.2 | 154 |
| Ex. 60 | FES1 | 10 | FET1 | 10 | Si/SiO/C | PAI | 15 | 78 | 3.5 | 152 |
| Ex. 61 | FES1 | 10 | FET1 | 15 | Si/SiO/C | PAI | 15 | 85 | 2.2 | 141 |
| Ex. 62 | FES1 | 10 | FET1 | 25 | Si/SiO/C | PAI | 15 | 86 | 1.9 | 145 |
| Ex. 63 | FES1 | 10 | FET1 | 30 | Si/SiO/C | PAI | 15 | 82 | 2.3 | 143 |

Examples 64 to 80

Secondary batteries were produced and evaluated in the same manner as in Example 46 except that a compound described in TABLE 5 was used as the chain-type fluorinated ether compound instead of FET1. The results are shown in TABLE 5.

TABLE 5

| | chain-type fluorinated ester | | chain-type fluorinated ether | | negative electrode | binder resin | | cycle maintenance rate (%) | volume increase (%) | resistance change ratio (%) |
|---|---|---|---|---|---|---|---|---|---|---|
| | kind | content (%) | kind | content (%) | active material | kind | content (%) | | | |
| Ex. 64 | FES1 | 10 | CH2F—O—CH2CH3 | 20 | Si/SiO/C | PAI | 15 | 81 | 3.5 | 158 |
| Ex. 65 | FES1 | 10 | CH2F—O—CH2CH2F | 20 | Si/SiO/C | PAI | 15 | 83 | 2.9 | 161 |
| Ex. 66 | FES1 | 10 | CH2F—CH2—O—CH2CH3 | 20 | Si/SiO/C | PAI | 15 | 84 | 3.6 | 152 |
| Ex. 67 | FES1 | 10 | CH2F—CH2—O—CH2CH2—O—CH2CH3 | 20 | Si/SiO/C | PAI | 15 | 81 | 3.2 | 145 |
| Ex. 68 | FES1 | 10 | H—CF2CF2—CH2O—CHFCF2—H | 20 | Si/SiO/C | PAI | 15 | 85 | 2.2 | 153 |
| Ex. 69 | FES1 | 10 | H—CF2CF2—CH2O—CF2CHF—H | 20 | Si/SiO/C | PAI | 15 | 86 | 2.5 | 142 |
| Ex. 70 | FES1 | 10 | H—CF2CF2—CH2O—CF2CH2—H | 20 | Si/SiO/C | PAI | 15 | 85 | 2.1 | 140 |
| Ex. 71 | FES1 | 10 | H—CF2CF2—CH2O—CH2CH2—H | 20 | Si/SiO/C | PAI | 15 | 84 | 2.9 | 146 |
| Ex. 72 | FES1 | 10 | H—CHFCF2—CH2O—CF2CF2—H | 20 | Si/SiO/C | PAI | 15 | 86 | 1.9 | 158 |
| Ex. 73 | FES1 | 10 | H—CF2CHF—CH2O—CF2CF2—H | 20 | Si/SiO/C | PAI | 15 | 86 | 2.6 | 141 |

TABLE 5-continued

| | electrolyte liquid | | | | negative electrode | | | | |
|---|---|---|---|---|---|---|---|---|---|
| | chain-type fluorinated ester | | chain-type fluorinated ether | | negative electrode | binder resin | | cycle maintenance | volume increase | resistance change |
| | kind | content (%) | kind | content (%) | active material | kind | content (%) | rate (%) | (%) | ratio (%) |
| Ex. 74 | FES1 | 10 | H—CH2CF2—CH2O—CF2CF2—H | 20 | Si/SiO/C | PAI | 15 | 85 | 2.4 | 153 |
| Ex. 75 | FES1 | 10 | H—CH2CH2—CH2O—CF2CF2—H | 20 | Si/SiO/C | PAI | 15 | 83 | 2.4 | 158 |
| Ex. 76 | FES1 | 10 | H—CHFCF2—CH2O—CHFCF2—H | 20 | Si/SiO/C | PAI | 15 | 83 | 2.5 | 145 |
| Ex. 77 | FES1 | 10 | H—CF2CHF—CH2O—CF2CHF—H | 20 | Si/SiO/C | PAI | 15 | 84 | 2.1 | 149 |
| Ex. 78 | FES1 | 10 | H—CF2CH2—CH2O—CF2CH2—H | 20 | Si/SiO/C | PAI | 15 | 85 | 2.3 | 142 |
| Ex. 79 | FES1 | 10 | H—CH2CHF—CH2O—CH2CHF—H | 20 | Si/SiO/C | PAI | 15 | 82 | 2.8 | 154 |
| Ex. 80 | FES1 | 10 | H—CH2CH2—CH2O—CH2CHF—H | 20 | Si/SiO/C | PAI | 15 | 83 | 2.6 | 146 |

Example 81

<Production of Positive Electrode>

First, powders of $MnO_2$, NiO, $Li_2CO_3$ and $Ti_3O_3$ were used as raw materials for a positive electrode active material. They were weighted so as to achieve the desired composition ratio and were pulverized and mixed. Then, the mixed powder was calcined at 750° C. for 8 hours to produce $LiNi_{0.5}Mn_{1.37}Ti_{0.13}O_4$. It was confirmed that the positive electrode active material obtained had a spinel structure which has almost single phase. The positive electrode active material produced was mixed with carbon black that was an electroconductive-imparting agent, and this mixture was dispersed in a solution obtained by dissolving a polyvinylidene fluoride (PVDF) as a binder in N-methylpyrrolidone to prepare a positive electrode slurry. The mass ratio of the positive electrode active material, the electroconductive-imparting agent, and the positive electrode binder was set to be 91/5/4. The positive electrode slurry was uniformly applied to both sides of a collector consisting of Al. After that, the slurry formed on the collector was dried in vacuum for 12 hours, and was compressed and molded with a roll press to produce a positive electrode.

<Production of Negative Electrode>

Graphite was used as a negative electrode active material. It was dispersed in a solution obtained by dissolving a polyvinylidene fluoride (PVDF) as a binder in N-methyl-pyrrolidone to prepare a negative electrode slurry. The mass ratio of the negative electrode active material and the binder was set to be 90/10. The negative electrode slurry was uniformly applied to both sides of a collector consisting of Cu. After that, the slurry formed on the collector was dried in vacuum for 12 hours, and was compressed and molded with a roll press to produce a negative electrode.

<Electrolyte Liquid>

A carbonate non-aqueous solvent (ethylene carbonate (EC)), a chain-type fluorinated ester compound represented by formula (1) ($R_1$=$CH_3$—, $R_2$=$CH_2F$—), and a chain-type fluorinated ether compound represented by formula (2) (H—$CF_2CF_2$—$CH_2O$—$CF_2CF_2$—H) were mixed at 50:10:40 (volume ratio) to prepare a mixed solvent. $LiPF_6$ as a supporting salt was added to the mixed solvent at a concentration of 1 mol/l to prepare an electrolyte liquid. Note that, hereinafter, the chain-type fluorinated ether compound (H—$CF_2CF_2$—$CH_2O$—$CF_2CF_2$—H) is abbreviated as FET1. Note that, in the mixed solvent prepared, the content of the chain-type fluorinated ester compound is 10 vol %, and the content of the chain-type fluorinated ether compound is 40 vol %.

<Evaluation>

(Cycle Property and Resistance Change Ratio at 55° C.)

A test, in which the secondary battery produced was repeatedly charged and discharged within a voltage range of 3.0 V to 4.75 V in a thermostatic oven kept at a temperature of 55° C., was carried out to evaluate the cycle maintenance rate (%) and the swollenness ratio (%). As for the charge, it was charged at 1 C to 4.75 V and the constant voltage charge was then carried out for 2.5 hours in total. As for the discharge, the constant current discharge was carried out at 1 C to 3.0 V.

A secondary battery was produced and evaluated in the same manner as in Example 1 except for the above.

Examples 82 to 110

Secondary batteries were produced and evaluated in the same manner as in Example 81 except that the chain-type fluorinated ester compound was a compound described in TABLE 6 or 7.

Comparative Example 1

A secondary battery was produced and evaluated in the same manner as in Example 81 except that the chain-type fluorinated ester compound and the chain-type fluorinated ether compound were not used and that the composition of the non-aqueous solvent was ethylene carbonate (EC):dimethyl carbonate (DMC)=50:50.

Comparative Example 2

A secondary battery was produced and evaluated in the same manner as in Example 81 except that the chain-type fluorinated ether compound was not used and that the composition of the non-aqueous solvent was EC:DMC:FES2 ($R_1$=$CF_3CF_2CF_2$—, $R_2$=$CH_3CH_2$—)=50:40:10.

Comparative Example 3

A secondary battery was produced and evaluated in the same manner as in Example 81 except that the chain-type fluorinated ester compound was not used and that the composition of the non-aqueous solvent was EC:DMC:FET1=50:10:40. The results are shown in TABLE 7.

TABLE 6

| | carbonate solvent | | chain-type fluorinated ester | | | chain-type fluorinated ether | | | cycle maintenance rate (%) | volume increase (%) |
|---|---|---|---|---|---|---|---|---|---|---|
| | kind | content (%) | R1 | R2 | content (%) | kind | content (%) | positive electrode | | |
| Ex. 81 | EC | 50 | CH3— | CH2F— | 10 | FET1 | 40 | $LiNi_{0.5}Mn_{1.37}Ti_{0.13}O_4$ | 80 | 4.8 |
| Ex. 82 | EC | 50 | CH3— | CHF2CH2— | 10 | FET1 | 40 | $LiNi_{0.5}Mn_{1.37}Ti_{0.13}O_4$ | 81 | 4.7 |
| Ex. 83 | EC | 50 | CHF2— | CH3— | 10 | FET1 | 40 | $LiNi_{0.5}Mn_{1.37}Ti_{0.13}O_4$ | 79 | 4.7 |
| Ex. 84 | EC | 50 | CHF2— | CH2F— | 10 | FET1 | 40 | $LiNi_{0.5}Mn_{1.37}Ti_{0.13}O_4$ | 80 | 4.5 |
| Ex. 85 | EC | 50 | CHF2— | CHF2— | 10 | FET1 | 40 | $LiNi_{0.5}Mn_{1.37}Ti_{0.13}O_4$ | 78 | 4.4 |
| Ex. 86 | EC | 50 | CHF2— | CH3CH2— | 10 | FET1 | 40 | $LiNi_{0.5}Mn_{1.37}Ti_{0.13}O_4$ | 79 | 5.1 |
| Ex. 87 | EC | 50 | CHF2— | CH2FCH2— | 10 | FET1 | 40 | $LiNi_{0.5}Mn_{1.37}Ti_{0.13}O_4$ | 80 | 4.9 |
| Ex. 88 | EC | 50 | CHF2— | CHF2CH2— | 10 | FET1 | 40 | $LiNi_{0.5}Mn_{1.37}Ti_{0.13}O_4$ | 77 | 5.4 |
| Ex. 89 | EC | 50 | CH3CH2— | CH2F— | 10 | FET1 | 40 | $LiNi_{0.5}Mn_{1.37}Ti_{0.13}O_4$ | 76 | 5.8 |
| Ex. 90 | EC | 50 | CH3CH2— | CHF2— | 10 | FET1 | 40 | $LiNi_{0.5}Mn_{1.37}Ti_{0.13}O_4$ | 76 | 5.4 |
| Ex. 91 | EC | 50 | CHF2CH2— | CH3— | 10 | FET1 | 40 | $LiNi_{0.5}Mn_{1.37}Ti_{0.13}O_4$ | 77 | 5.2 |
| Ex. 92 | EC | 50 | CHF2CH2— | CH2F— | 10 | FET1 | 40 | $LiNi_{0.5}Mn_{1.37}Ti_{0.13}O_4$ | 78 | 5.0 |
| Ex. 93 | EC | 50 | CHF2CH2— | CHF2— | 10 | FET1 | 40 | $LiNi_{0.5}Mn_{1.37}Ti_{0.13}O_4$ | 78 | 4.9 |
| Ex. 94 | EC | 50 | CHF2CH2— | CH3CH2— | 10 | FET1 | 40 | $LiNi_{0.5}Mn_{1.37}Ti_{0.13}O_4$ | 76 | 5.5 |
| Ex. 95 | EC | 50 | CHF2CH2— | CH2FCH2— | 10 | FET1 | 40 | $LiNi_{0.5}Mn_{1.37}Ti_{0.13}O_4$ | 77 | 5.1 |
| Ex. 96 | EC | 50 | CHF2CH2— | CHF2CH2— | 10 | FET1 | 40 | $LiNi_{0.5}Mn_{1.37}Ti_{0.13}O_4$ | 80 | 4.7 |
| Ex. 97 | EC | 50 | CHF2CF2— | CH3— | 10 | FET1 | 40 | $LiNi_{0.5}Mn_{1.37}Ti_{0.13}O_4$ | 79 | 4.3 |
| Ex. 98 | EC | 50 | CH3CF2— | CH2F— | 10 | FET1 | 40 | $LiNi_{0.5}Mn_{1.37}Ti_{0.13}O_4$ | 81 | 4.4 |
| Ex. 99 | EC | 50 | CH3CF2— | CHF2— | 10 | FET1 | 40 | $LiNi_{0.5}Mn_{1.37}Ti_{0.13}O_4$ | 77 | 5.1 |

TABLE 7

| | carbonate solvent | | chain-type fluorinated ester | | | chain-type fluorinated ether | | | cycle maintenance rate (%) | volume increase (%) |
|---|---|---|---|---|---|---|---|---|---|---|
| | kind | content (%) | R1 | R2 | content (%) | kind | content (%) | positive electrode | | |
| Ex. 100 | EC | 50 | CH3CF2— | CH3CH2— | 10 | FET1 | 40 | $LiNi_{0.5}Mn_{1.37}Ti_{0.13}O_4$ | 76 | 5.3 |
| Ex. 101 | EC | 50 | CH3CF2— | CH2FCH2— | 10 | FET1 | 40 | $LiNi_{0.5}Mn_{1.37}Ti_{0.13}O_4$ | 78 | 5.2 |
| Ex. 102 | EC | 50 | CH3CF2— | CHF2CH2— | 10 | FET1 | 40 | $LiNi_{0.5}Mn_{1.37}Ti_{0.13}O_4$ | 77 | 5.0 |
| Ex. 103 | EC | 50 | CF3CH2— | CH3— | 10 | FET1 | 40 | $LiNi_{0.5}Mn_{1.37}Ti_{0.13}O_4$ | 78 | 4.8 |
| Ex. 104 | EC | 50 | CF3CH2— | CH3CH2— | 10 | FET1 | 40 | $LiNi_{0.5}Mn_{1.37}Ti_{0.13}O_4$ | 79 | 4.5 |
| Ex. 105 | EC | 50 | CF3CHF— | CH3— | 10 | FET1 | 40 | $LiNi_{0.5}Mn_{1.37}Ti_{0.13}O_4$ | 80 | 4.6 |
| Ex. 106 | EC | 50 | CF3CF2— | CH3— | 10 | FET1 | 40 | $LiNi_{0.5}Mn_{1.37}Ti_{0.13}O_4$ | 78 | 5.0 |
| Ex. 107 | EC | 50 | CF3CF2— | CH3CH2— | 10 | FET1 | 40 | $LiNi_{0.5}Mn_{1.37}Ti_{0.13}O_4$ | 79 | 4.9 |
| Ex. 108 | EC | 50 | CF3CF2CF2— | CH3CH2— | 10 | FET1 | 40 | $LiNi_{0.5}Mn_{1.37}Ti_{0.13}O_4$ | 80 | 4.3 |
| Ex. 109 | EC | 50 | CF3C(CF3)H— | CH3— | 10 | FET1 | 40 | $LiNi_{0.5}Mn_{1.37}Ti_{0.13}O_4$ | 77 | 4.7 |
| Ex. 110 | EC | 50 | CF3C(CF3)F— | CH3— | 10 | FET1 | 40 | $LiNi_{0.5}Mn_{1.37}Ti_{0.13}O_4$ | 82 | 4.1 |
| Comp. Ex. 1 | EC/DMC | 50/50 | — | — | — | — | — | $LiNi_{0.5}Mn_{1.37}Ti_{0.13}O_4$ | 67 | 33.6 |
| Comp. Ex. 2 | EC/DMC | 50/40 | CF3CF2CF2— | CH3CH2— | 10 | — | — | $LiNi_{0.5}Mn_{1.37}Ti_{0.13}O_4$ | 69 | 26.3 |
| Comp. Ex. 3 | EC/DMC | 50/10 | — | — | — | FET1 | 40 | $LiNi_{0.5}Mn_{1.37}Ti_{0.13}O_4$ | 72 | 18.4 |

Examples 111 to 124

Secondary batteries were produced and evaluated in the same manner as in Example 81 except that a compound described in TABLE 8 was used as the positive electrode active material. The results are shown in TABLE 8. Note that, the chain-type fluorinated ester compound ($R_1$=$CF_3CF_2CF_2$—, $R_2$=$CH_3CH_2$—) is abbreviated as FES2.

TABLE 8

| | electrolyte liquid | | | | | | cycle maintenance rate (%) | volume increase (%) |
|---|---|---|---|---|---|---|---|---|
| | chain-type fluorinated ester | | chain-type fluorinated ether | | | | | |
| | kind | content (%) | kind | content (%) | positive electrode | | | |
| Ex. 81 | FES2 | 10 | FET1 | 40 | $LiNi_{0.5}Mn_{1.37}Ti_{0.13}O_4$ | | 78 | 6.3 |
| Ex. 111 | FES2 | 10 | FET1 | 40 | $LiNi_{0.5}Mn_{1.48}Ti_{0.02}O_4$ | | 76 | 6.5 |
| Ex. 112 | FES2 | 10 | FET1 | 40 | $LiNi_{0.5}Mn_{1.45}Si_{0.05}O_4$ | | 75 | 6.2 |
| Ex. 113 | FES2 | 10 | FET1 | 40 | $LiNi_{0.5}Mn_{1.45}Mg_{0.05}O_4$ | | 75 | 7.0 |
| Ex. 114 | FES2 | 10 | FET1 | 40 | $LiNi_{0.5}Mn_{1.45}Na_{0.05}O_4$ | | 76 | 7.2 |
| Ex. 115 | FES2 | 10 | FET1 | 40 | $LiNi_{0.5}Mn_{1.45}Li_{0.05}O_4$ | | 74 | 7.4 |
| Ex. 116 | FES2 | 10 | FET1 | 40 | $LiNi_{0.5}Mn_{1.45}B_{0.05}O_4$ | | 75 | 7.3 |
| Ex. 117 | FES2 | 10 | FET1 | 40 | $LiNi_{0.5}Mn_{1.45}Al_{0.05}O_{3.95}F_{0.05}$ | | 77 | 7.4 |
| Ex. 118 | FES2 | 10 | FET1 | 40 | $LiNi_{0.5}Mn_{1.5}O_4$ | | 72 | 7.1 |
| Ex. 119 | FES2 | 10 | FET1 | 40 | $LiNi_{0.25}Fe_{0.25}Mn_{1.5}O_4$ | | 67 | 8.9 |
| Ex. 120 | FES2 | 10 | FET1 | 40 | $LiNi_{0.25}Cr_{0.25}Mn_{1.5}O_4$ | | 64 | 9.3 |
| Ex. 121 | FES2 | 10 | FET1 | 40 | $LiFe_{0.5}Mn_{1.5}O_4$ | | 60 | 11.2 |
| Ex. 122 | FES2 | 10 | FET1 | 40 | $LiFe_{0.5}Mn_{1.45}Na_{0.05}O_{3.95}F_{0.15}$ | | 61 | 11.8 |
| Ex. 123 | FES2 | 10 | FET1 | 40 | $LiCoPO_4$ | | 57 | 12.5 |
| Ex. 124 | FES2 | 10 | FET1 | 40 | $Li(Li_{0.15}Ni_{0.2}Mn_{0.65})O_2$ | | 58 | 12.3 |

Examples 125 to 135

Secondary batteries were produced and evaluated in the same manner as in Example 81 except that the contents (vol %) of the chain-type fluorinated ester compound (FES2), the chain-type fluorinated ether compound (FET1), and the carbonate solvent (EC/DMC) were set as shown in TABLE 9. The results are shown in TABLE 9.

TABLE 9

| | electrolyte liquid | | | | | | | cycle maintenance rate (%) | volume increase (%) |
|---|---|---|---|---|---|---|---|---|---|
| | carbonate solvent | | chain-type fluorinated ester | | chain-type fluorinated ether | | positive electrode | | |
| | kind | content (%) | kind | content (%) | kind | content (%) | | | |
| Ex. 81 | EC | 50 | FES2 | 10 | FET1 | 40 | $LiNi_{0.5}Mn_{1.37}Ti_{0.13}O_4$ | 80 | 4.3 |
| Ex. 125 | EC/DMC | 50/35 | FES2 | 10 | FET1 | 5 | $LiNi_{0.5}Mn_{1.37}Ti_{0.13}O_4$ | 72 | 16.3 |
| Ex. 126 | EC/DMC | 50/30 | FES2 | 10 | FET1 | 10 | $LiNi_{0.5}Mn_{1.37}Ti_{0.13}O_4$ | 74 | 12.2 |
| Ex. 127 | EC/DMC | 50/25 | FES2 | 10 | FET1 | 15 | $LiNi_{0.5}Mn_{1.37}Ti_{0.13}O_4$ | 77 | 8.6 |
| Ex. 128 | EC/DMC | 50/15 | FES2 | 10 | FET1 | 25 | $LiNi_{0.5}Mn_{1.37}Ti_{0.13}O_4$ | 78 | 5.9 |
| Ex. 129 | EC/DMC | 40/25 | FES2 | 10 | FET1 | 25 | $LiNi_{0.5}Mn_{1.37}Ti_{0.13}O_4$ | 76 | 6.4 |
| Ex. 130 | EC/DMC | 40/20 | FES2 | 10 | FET1 | 30 | $LiNi_{0.5}Mn_{1.37}Ti_{0.13}O_4$ | 77 | 5.8 |
| Ex. 131 | EC/DMC | 40/10 | FES2 | 10 | FET1 | 40 | $LiNi_{0.5}Mn_{1.37}Ti_{0.13}O_4$ | 77 | 5.1 |
| Ex. 132 | EC | 55 | FES2 | 5 | FET1 | 40 | $LiNi_{0.5}Mn_{1.37}Ti_{0.13}O_4$ | 79 | 4.5 |
| Ex. 133 | EC | 45 | FES2 | 15 | FET1 | 40 | $LiNi_{0.5}Mn_{1.37}Ti_{0.13}O_4$ | 81 | 4.7 |
| Ex. 134 | EC | 30 | FES2 | 20 | FET1 | 50 | $LiNi_{0.5}Mn_{1.37}Ti_{0.13}O_4$ | 75 | 4.8 |
| Ex. 135 | EC | 40 | FES2 | 20 | FET1 | 40 | $LiNi_{0.5}Mn_{1.37}Ti_{0.13}O_4$ | 76 | 5.3 |

Example 136 to Example 154

Secondary batteries were produced and evaluated in the same manner as in Example 81 except that a compound described in TABLE 10 was used as the chain-type fluorinated ether compound. The results are shown in TABLE 10.

TABLE 10

| | carbonate solvent | | chain-type fluorinated ester | | chain-type fluorinated ether | | | cycle maintenance rate (%) | volume increase (%) |
|---|---|---|---|---|---|---|---|---|---|
| | kind | content (%) | kind | content (%) | kind | content (%) | positive electrode | | |
| Comp. Ex. 1 | EC/DMC | 50/50 | — | | — | | $LiNi_{0.5}Mn_{1.37}Ti_{0.13}O_4$ | 67 | 33.6 |
| Comp. Ex. 2 | EC/DMC | 50/40 | FES2 | 10 | — | | $LiNi_{0.5}Mn_{1.37}Ti_{0.13}O_4$ | 69 | 26.3 |
| Comp. Ex. 3 | EC/DMC | 50/10 | — | | FET1 | 40 | $LiNi_{0.5}Mn_{1.37}Ti_{0.13}O_4$ | 72 | 18.4 |
| Ex. 81 | EC | 50 | FES2 | 10 | FET1 | 40 | $LiNi_{0.5}Mn_{1.37}Ti_{0.13}O_4$ | 81 | 4.3 |
| Ex. 136 | EC | 50 | FES2 | 10 | CH2F—O—CH2CH3 | 40 | $LiNi_{0.5}Mn_{1.37}Ti_{0.13}O_4$ | 76 | 8.1 |
| Ex. 137 | EC | 50 | FES2 | 10 | CH2F—O—CH2CH2F | 40 | $LiNi_{0.5}Mn_{1.37}Ti_{0.13}O_4$ | 77 | 7.6 |
| Ex. 138 | EC | 50 | FES2 | 10 | CH2F—CH2—O—CH2CH3 | 40 | $LiNi_{0.5}Mn_{1.37}Ti_{0.13}O_4$ | 77 | 6.8 |
| Ex. 139 | EC | 50 | FES2 | 10 | H—CF2—CH2O—CF2CFHCF3 | 40 | $LiNi_{0.5}Mn_{1.37}Ti_{0.13}O_4$ | 79 | 4.2 |
| Ex. 140 | EC | 50 | FES2 | 10 | H—CF2CF2—CH2O—CF2CFHCF3 | 40 | $LiNi_{0.5}Mn_{1.37}Ti_{0.13}O_4$ | 79 | 4.4 |
| Ex. 141 | EC | 50 | FES2 | 10 | CF3CF2—CH2O—CF2CFHCF3 | 40 | $LiNi_{0.5}Mn_{1.37}Ti_{0.13}O_4$ | 78 | 4.5 |
| Ex. 142 | EC | 50 | FES2 | 10 | H—CF2CF2—CH2O—CHFCF2—H | 40 | $LiNi_{0.5}Mn_{1.37}Ti_{0.13}O_4$ | 79 | 6 |
| Ex. 143 | EC | 50 | FES2 | 10 | H—CF2CF2—CH2O—CF2CHF—H | 40 | $LiNi_{0.5}Mn_{1.37}Ti_{0.13}O_4$ | 80 | 5.6 |
| Ex. 144 | EC | 50 | FES2 | 10 | H—CF2CF2—CH2O—CF2CH2—H | 40 | $LiNi_{0.5}Mn_{1.37}Ti_{0.13}O_4$ | 78 | 5.2 |
| Ex. 145 | EC | 50 | FES2 | 10 | H—CF2CF2—CH2O—CH2CH2—H | 40 | $LiNi_{0.5}Mn_{1.37}Ti_{0.13}O_4$ | 78 | 6.6 |
| Ex. 146 | EC | 50 | FES2 | 10 | H—CHFCF2—CH2O—CF2CF2—H | 40 | $LiNi_{0.5}Mn_{1.37}Ti_{0.13}O_4$ | 79 | 4.9 |
| Ex. 147 | EC | 50 | FES2 | 10 | H—CF2CHF—CH2O—CF2CF2—H | 40 | $LiNi_{0.5}Mn_{1.37}Ti_{0.13}O_4$ | 79 | 5.0 |
| Ex. 148 | EC | 50 | FES2 | 10 | H—CH2CF2—CH2O—CF2CF2—H | 40 | $LiNi_{0.5}Mn_{1.37}Ti_{0.13}O_4$ | 77 | 5.5 |
| Ex. 149 | EC | 50 | FES2 | 10 | H—CH2CH2—CH2O—CF2CF2—H | 40 | $LiNi_{0.5}Mn_{1.37}Ti_{0.13}O_4$ | 76 | 5.8 |
| Ex. 150 | EC | 50 | FES2 | 10 | H—CHFCF2—CH2O—CHFCF2—H | 40 | $LiNi_{0.5}Mn_{1.37}Ti_{0.13}O_4$ | 75 | 5.1 |
| Ex. 151 | EC | 50 | FES2 | 10 | H—CF2CHF—CH2O—CF2CHF—H | 40 | $LiNi_{0.5}Mn_{1.37}Ti_{0.13}O_4$ | 74 | 4.6 |
| Ex. 152 | EC | 50 | FES2 | 10 | H—CF2CH2—CH2O—CF2CH2—H | 40 | $LiNi_{0.5}Mn_{1.37}Ti_{0.13}O_4$ | 75 | 6.2 |
| Ex. 153 | EC | 50 | FES2 | 10 | H—CH2CHF—CH2O—CH2CHF—H | 40 | $LiNi_{0.5}Mn_{1.37}Ti_{0.13}O_4$ | 76 | 6.5 |
| Ex. 154 | EC | 50 | FES2 | 10 | H—CH2CH2—CH2O—CH2CHF—H | 40 | $LiNi_{0.5}Mn_{1.37}Ti_{0.13}O_4$ | 75 | 7.1 |

From TABLE 1, it has been confirmed that the cycle maintenance rate is improved, that volume increase is decreased, and further that resistance increase is reduced, by using an electrolyte liquid containing a chain-type fluorinated ester compound and a chain-type fluorinated ether compound.

In particular, although volume increase may become a problem in the negative electrode containing silicon, volume increase was further reduced in a high temperature environment by using an electrolyte liquid containing a chain-type fluorinated ester compound and a chain-type fluorinated ether. Further, it has been found that the cycle maintenance rate, volume increase, and resistance increase are further improved by using a negative electrode containing a Si/SiO/C complex.

From TABLES 6 to 10, it has been found that volume increase due to the gas generation in the high-temperature cycle is improved and that the cycle maintenance rate is improved by using an electrolyte liquid containing a chain-type fluorinated ester compound and a chain-type fluorinated ether, even in the case of using a positive electrode active material that operates at a potential of 4.5 V or higher with respect to lithium.

This application claims the priorities based on Japanese Patent Application No. 2011-070109, filed on Mar. 28, 2011 and PCT/JP2011/072036 filed on Sep. 27, 2011, all the disclosure of which are incorporated herein by reference.

The present invention was explained with reference to embodiments and Examples, but the present invention is not limited to the above-mentioned embodiments and the Examples. In the constituents and the detail of the present invention, various changings which are understood by a person ordinarily skilled in the art can be made within the scope of the invention.

Also, one aspect of an exemplary embodiment of the invention can be understood to be an aspect described in the following Additional Statements.

(Additional Statement 1)

A lithium ion secondary battery, comprising: a positive electrode, a negative electrode comprising a negative electrode active material, and an electrolyte liquid;

wherein the electrolyte liquid comprises a chain-type fluorinated ester compound represented by following formula (X1) and a chain-type fluorinated ether compound represented by following formula (X2); and wherein the positive electrode comprises a positive electrode active material that operates at a potential of 4.5 V or higher with respect to lithium;

(X1)

wherein, in formula (X1), $R_1$ and $R_2$ each independently denote an alkyl group or a fluorine-substituted alkyl group, and at least one of $R_1$ and $R_2$ is a fluorine-substituted alkyl group; and

(X2)

wherein, in formula (X2), $R_a$ and $R_b$ each independently denote an alkyl group or a fluorine-substituted alkyl group, and at least one of $R_a$ and $R_b$ is a fluorine-substituted alkyl group.

(Additional Statement 2)

The lithium ion secondary battery according to Additional Statement 1, wherein the positive electrode active material is a lithium metal complex oxide represented by following formula (XA);

(XA)

wherein, in formula (XA), x, y, a, and w satisfy $0.4 \leq x \leq 1.2$, $0 \leq y$, $x+y<2$, $0 \leq a \leq 1.2$ and $0 \leq w \leq 1$, M is at least one selected from the group consisting of Co, Ni, Fe, Cr, and Cu, Y is at least one selected from the group consisting of Li, B, Na, Mg, Al, Ti, Si, K, and Ca, and Z is at least one selected from the group consisting of F and Cl.

(Additional Statement 3)

The lithium ion secondary battery according to Additional Statement 2, wherein, in formula (XA), M is Ni and Y is at least one selected from the group consisting of Ti and Al.

(Additional Statement 4)

The lithium ion secondary battery according to any one of Additional Statements 1 to 3, wherein the negative electrode active material comprises a carbon material.

(Additional Statement 5)

The lithium ion secondary battery according to any one of Additional Statements 1 to 3, wherein the negative electrode active material comprises metal (a) that can be alloyed with lithium.

(Additional Statement 6)

The lithium ion secondary battery according to Additional Statement 5, wherein metal (a) is silicon.

(Additional Statement 7)

The lithium ion secondary battery according to Additional Statement 5 or 6, wherein the negative electrode active material further comprises metal oxide (b) that can absorb and desorb lithium ion and carbon material (c) that can absorb and desorb lithium ion.

(Additional Statement 8)

The lithium ion secondary battery according to Additional Statement 7, wherein metal (a) is silicon, and metal oxide (b) is silicon oxide.

(Additional Statement 9)

The lithium ion secondary battery according to Additional Statement 8, wherein at least a part of the silicon oxide has an amorphous structure and at least a part of the silicon is dispersed in the silicon oxide.

(Additional Statement 10)

The lithium ion secondary battery according to any one of Additional Statements 1 to 9, wherein $R_1$ and $R_2$ are each independently a fluorine-substituted alkyl group.

(Additional Statement 11)

The lithium ion secondary battery according to any one of Additional Statements 1 to 9, wherein $R_1$ is an alkyl group, and $R_2$ is a fluorine-substituted alkyl group.

(Additional Statement 12)

The lithium ion secondary battery according to any one of Additional Statements 1 to 9, wherein $R_1$ is a fluorine-substituted alkyl group and $R_2$ is an alkyl group.

(Additional Statement 13)

The lithium ion secondary battery according to any one of Additional Statements 1 to 12, wherein the chain-type fluorinated ester compound is represented by following formula (X3);

$$F(CZ^1Z^2)_nCOO(CZ^3Z^4)_mCH_3 \quad (X3)$$

wherein, in formula (X3), n is 1 to 4, m is 1 to 4, and $Z^1$ to $Z^4$ are each independently fluorine atom or hydrogen atom; provided that at least one of $Z^1$ to $Z^2$ is fluorine atom.

(Additional Statement 14)

The lithium ion secondary battery according to any one of Additional Statements 1 to 13, wherein the chain-type fluorinated ether compound is represented by following formula (X4);

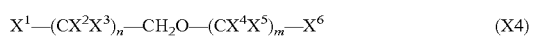

$$X^1-(CX^2X^3)_n-CH_2O-(CX^4X^5)_m-X^6 \quad (X4)$$

wherein, in formula (X4), n is 1 to 8, m is 2 to 4, and $X^1$ to $X^6$ are each independently fluorine atom or hydrogen atom; provided that at least one of $X^1$ to $X^3$ is fluorine atom and at least one of $X^4$ to $X^6$ is fluorine atom.

(Additional Statement 15)

The lithium ion secondary battery according to any one of Additional Statements 1 to 14, wherein the electrolyte liquid further comprises a carbonate compound.

(Additional Statement 16)

The lithium ion secondary battery according to Additional Statement 15, wherein the electrolyte liquid comprises a supporting salt and a non-aqueous solvent which comprises the chain-type fluorinated ester compound, the chain-type fluorinated ether compound, and the carbonate compound; and wherein the content of the chain-type fluorinated ester compound in the non-aqueous solvent is 1 to 15 vol %, the content of the chain-type fluorinated ether compound in the non-aqueous solvent is 10 to 45 vol %, and the content of the carbonate compound in the non-aqueous solvent is 30 to 89 vol %.

(Additional Statement 17)

The lithium ion secondary battery according to any one of Additional Statements 1 to 16, wherein the negative electrode contains a binder, and wherein the binder is a polyimide or a polyamide-imide.

(Additional Statement 18)

The lithium ion secondary battery according to any one of Additional Statements 1 to 17, which has a stacked laminate structure.

(Additional Statement 19)

The lithium ion secondary battery according to Additional Statement 18, wherein the package is an aluminum laminate film.

INDUSTRIAL APPLICABILITY

An exemplary embodiment of the invention can be utilized in every industrial field that requires a power supply and in an industrial field concerning a transportation, a storage, and a supply of an electrical energy. Specifically, it can be utilized, for examples, for a power supply of a mobile device such as a mobile phone and a laptop computer; a power supply of a moving or a transport medium such as a train, a satellite and a submarine, and which includes an electric vehicle such as an electric car, a hybrid car, an electric motorcycle, and an electric power-assisted bicycle; a back-up power supply such as UPS; and a power storage device of an electric power which is generated by a solar power generation or a wind power generation.

REFERENCE SIGNS LIST a negative electrode
b separator
c positive electrode
d negative electrode collector
e positive electrode collector
f positive electrode terminal
g negative electrode terminal

What is claimed is:
1. A lithium ion secondary battery, comprising:
a positive electrode comprising a positive electrode active material,
a negative electrode comprising a negative electrode active material, and
an electrolyte liquid;

wherein the negative electrode active material comprises silicon (a), silicon oxide (b) and carbon material (c) that can absorb and desorb lithium ion;

wherein the electrolyte liquid comprises a supporting salt and a non-aqueous solvent, the non-aqueous solvent consisting essentially of a chain-type fluorinated ester compound represented by formula (1), a chain-type fluorinated ether compound represented by formula (2), and a carbonate compound;

wherein the content of the chain-type fluorinated ester compound in the non-aqueous solvent is 1 to 15 vol %, the content of the chain type fluorinated ether compound in the non-aqueous solvent is 10 to 45 vol %, and the content of the carbonate compound in the non-aqueous solvent is 40 to 89 vol %:

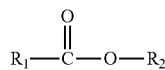
(1)

wherein, in formula (1), $R_1$ is an alkyl group or a fluorine-substituted alkyl group, and $R_2$ is a fluorine-substituted alkyl group*³; and $$R_a\text{—O—}R_b \quad (2)$$

wherein, in formula (2), $R_a$ and $R_b$ are each independently an alkyl group or a fluorine-substituted alkyl group, and at least one of $R_a$ and $R_b$ is a fluorine-substituted alkyl group.

2. The lithium ion secondary battery according to claim 1, wherein the positive electrode active material is a lithium metal complex oxide represented by any one of following formulae (5) to (10):

$$Li_a(M_xMn_{2-x-y}Y_y)(O_{4-w}Z_w) \quad (5)$$

wherein, in formula (5), x, y, a, and w satisfy 0.4≤x≤1.2, 0<y, x+y<2, 0≤a≤1.2 and 0≤w≤1, M is at least one selected from the group consisting of Co, Ni, Fe, Cr, and Cu, Y is at least one selected from the group consisting of Li, B, Na, K, and Ca, and Z is at least one selected from the group consisting of F and Cl;

$$LiMPO_4 \quad (6)$$

wherein, in formula (6), M is at least one selected from the group consisting of Co and Ni;

$$Li(M_yMn_z)O_2 \quad (7)$$

wherein, in formula (7), y and z satisfy 0.1≤y≤0.5 and 0.7≥z≥0.33, and M is at least one selected from the group consisting of Li, Co, and Ni;

$$Li(Li_xM_yMn_z)O_2 \quad (8)$$

wherein, in formula (8), x, y, and z satisfy 0.3>x≥0.1, 0.1≤y≤0.4, and 0.7≥z≥0.33, and M is at least one selected from the group consisting of Li, Co, and Ni;

$$Li_\alpha Ni_\beta Co_\gamma Al_\delta O_2 \quad (9)$$

wherein, in formula (9), α, β, γ, and δ satisfy 1≤α≤1.2, β+γ+δ=1, β≥0.7, and γ≤0.2; and $$Li_\alpha Ni_\beta Co_\gamma Mn_\delta O_2 \quad (10)$$

wherein, in formula (10), α, β, γ, and δ satisfy 1≤α≤1.2, β+γ+δ=1, β≥0.6, and γ≤0.2.

3. The lithium ion secondary battery according to claim 1, wherein at least a part of the silicon oxide has an amorphous structure and at least a part of the silicon is dispersed in the silicon oxide.

4. The lithium ion secondary battery according to claim 1, wherein the chain-type fluorinated ether compound is represented by following formula (4);

$$X^1\text{—}(CX^2X^3)_n\text{—}CH_2O\text{—}(CX^4X^5)_m\text{—}X^6 \quad (4)$$

wherein, in formula (4), n is 1 to 8, m is 2 to 4, and $X^1$ to $X^6$ are each independently fluorine atom or hydrogen atom; provided that at least one of $X^1$ to $X^3$ is fluorine atom and at least one of $X^4$ to $X^6$ is fluorine atom.

5. The lithium ion secondary battery according to claim 2, wherein the positive electrode active material is a lithium metal complex oxide represented by the formula (9).

6. The lithium ion secondary battery according to claim 1, wherein the positive electrode active material is the lithium metal complex oxide represented by the formula (10).

7. A lithium ion secondary battery, comprising:
a positive electrode comprising a positive electrode active material,
a negative electrode comprising a negative electrode active material, and
an electrolyte liquid;
wherein the positive electrode active material comprises a lithium metal complex oxide that operates at a potential of 4.5 V or higher with respect to lithium;
wherein the negative electrode active material comprises silicon (a), silicon oxide (b) and carbon material (c) that can absorb and desorb lithium ion;
wherein the electrolyte liquid comprises a supporting salt and a non-aqueous solvent, the non-aqueous solvent consisting essentially of a chain-type fluorinated ester compound represented by formula (1), a chain-type fluorinated ether compound represented by formula (2), and a carbonate compound;
wherein the content of the chain-type fluorinated ester compound in the non-aqueous solvent is 1 to 15 vol %, the content of the chain type fluorinated ether compound in the non-aqueous solvent is 10 to 45 vol %, and the content of the carbonate compound in the non-aqueous solvent is 40 to 89 vol %:

(1)

wherein, in formula (1), $R_1$ is an alkyl group or a fluorine-substituted alkyl group, and $R_2$ is a fluorine-substituted alkyl group; and $$R_a\text{—O—}R_b \quad (2)$$

wherein, in formula (2), $R_a$ and $R_b$ are each independently an alkyl group or a fluorine-substituted alkyl group, and at least one of $R_a$ and $R_b$ is a fluorine-substituted alkyl group.

8. The lithium ion secondary battery according to claim 7, wherein the positive electrode active material is a lithium metal complex oxide represented by any one of following formulae (5) to (8):

$$Li_a(M_xMn_{2-x-y}Y_y)(O_{4-w}Z_w) \quad (5)$$

wherein, in formula (5), x, y, a, and w satisfy 0.4≤x≤1.2, 0<y, x+y<2, 0≤a≤1.2 and 0≤w≤1, M is at least one selected from the group consisting of Co, Ni, Fe, Cr, and Cu, Y is at least one selected from the group consisting of Li, B, Na, K, and Ca, and Z is at least one selected from the group consisting of F and Cl;

$$\text{LiMPO}_4 \qquad (6)$$

wherein, in formula (6), M is at least one selected from the group consisting of Co and Ni;

$$\text{Li}(M_y\text{Mn}_z)O_2 \qquad (7)$$

wherein, in formula (7), y and z satisfy $0.1 \leq y \leq 0.5$ and $0.7 \geq z \geq 0.33$, and M is at least one selected from the group consisting of Li, Co, and Ni; and $$\text{Li}(\text{Li}_x M_y \text{Mn}_z)O_2 \qquad (8)$$

wherein, in formula (8), x, y, and z satisfy $0.3 > x \geq 0.1$, $0.1 \leq y \leq 0.4$, and $0.7 \geq z \geq 0.33$, and M is at least one selected from the group consisting of Li, Co, and Ni.

9. The lithium ion secondary battery according to claim 7, wherein at least a part of the silicon oxide has an amorphous structure and at least a part of the silicon is dispersed in the silicon oxide.

10. The lithium ion secondary battery according to claim 7, wherein the chain-type fluorinated ether compound is represented by following formula (4);

$$X^1\text{—}(CX^2X^3)_n\text{—}CH_2O\text{—}(CX^4X^5)_m\text{—}X^6 \qquad (4)$$

wherein, in formula (4), n is 1 to 8, m is 2 to 4, and $X^1$ to $X^6$ are each independently fluorine atom or hydrogen atom; provided that at least one of $X^1$ to $X^3$ is fluorine atom and at least one of $X^4$ to $X^6$ is fluorine atom.

11. The lithium ion secondary battery according to claim 8, wherein the positive electrode active material is the lithium metal complex oxide represented by the formula (5) where M is Ni and Y is at least one selected from the group consisting of Ti and Al.

12. The lithium ion secondary battery according to claim 8, wherein the positive electrode active material is the lithium metal complex oxide represented by the formula (6), where M is Ni.

13. The lithium ion secondary battery according to claim 8, wherein the positive electrode active material is the lithium metal complex oxide represented by the formula (7), where M is Li or Co.

14. The lithium ion secondary battery according to claim 8, wherein the positive electrode active material is the lithium metal complex oxide represented by the formula (8).

* * * * *

UNITED STATES PATENT AND TRADEMARK OFFICE
CERTIFICATE OF CORRECTION

PATENT NO. : 10,749,208 B2
APPLICATION NO. : 14/008415
DATED : August 18, 2020
INVENTOR(S) : Makiko Uehara et al.

It is certified that error appears in the above-identified patent and that said Letters Patent is hereby corrected as shown below:

On the Title Page

Column 1, (30) Foreign Application Priority Date, Line 1; After "2011-070109", insert --¶Sep. 27, 2011 (JP) PCT/JP2011/072036--

In the Specification

Column 12, Line 57; Delete "$LiNi_{1/3}CO_{1/3}Mn_{1/3}O_2$" and insert --$LiNi_{1/3}Co_{1/3}Mn_{1/3}O_2$-- therefor Signed and Sealed this
Eighth Day of December, 2020

Andrei Iancu
*Director of the United States Patent and Trademark Office*